(12) United States Patent
Sugishita et al.

(10) Patent No.: US 11,194,334 B2
(45) Date of Patent: Dec. 7, 2021

(54) AUTONOMOUS MOBILE DEVICE, AUTONOMOUS DELIVERY SYSTEM, DELIVERY METHOD, AND NON-TRANSITORY RECORDING MEDIUM

(71) Applicant: Panasonic Intellectual Property Corporation of America, Torrance, CA (US)

(72) Inventors: Yoshihiro Sugishita, Osaka (JP); Masatsugu Fujita, Kanagawa (JP); Tatsuo Sakai, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 581 days.

(21) Appl. No.: 15/816,057

(22) Filed: Nov. 17, 2017

(65) Prior Publication Data

US 2018/0150078 A1 May 31, 2018

(30) Foreign Application Priority Data

Nov. 30, 2016 (JP) .............................. JP2016-233204
Jul. 27, 2017 (JP) .............................. JP2017-145758

(51) Int. Cl.
*G05D 1/02* (2020.01)
*G05D 1/00* (2006.01)

(52) U.S. Cl.
CPC ......... *G05D 1/0214* (2013.01); *G05D 1/0088* (2013.01); *G05D 1/0234* (2013.01); *G05D 1/0246* (2013.01); *G05D 2201/0206* (2013.01); *G05D 2201/0216* (2013.01)

(58) Field of Classification Search
None
See application file for complete search history.

(56) References Cited

U.S. PATENT DOCUMENTS

| | | | | |
|---|---|---|---|---|
| 9,964,951 B1* | 5/2018 | Dunn | ................... | G08G 5/0052 |
| 10,496,093 B2* | 12/2019 | Sonoura | ............... | G05D 1/0274 |
| 10,503,173 B2* | 12/2019 | Tsubota | ........... | G05B 19/41895 |
| 10,562,184 B2* | 2/2020 | Yamamoto | ........... | G01C 21/206 |
| 2005/0113978 A1* | 5/2005 | Sharma | .............. | G05D 23/1932 700/259 |

(Continued)

FOREIGN PATENT DOCUMENTS

JP 2014-209293 11/2014

*Primary Examiner* — Nicholas K Wiltey

(74) *Attorney, Agent, or Firm* — Greenblum & Bernstein, P.L.C.

(57) ABSTRACT

An autonomous mobile device includes a communicator, a map information storage, a mover, a path generator, and a moving controller. The communicator receives first mark information stored in a mark information storage from a mark management server device. The map information storage stores map information concerning a delivery area. The mover moves the autonomous mobile device. The path generator sets a first object to which a first mark is attached as a first delivery destination, and generates a path from a moving start position of the autonomous mobile device to the first delivery destination based on the first mark information and the map information. The moving controller controls the mover to move the autonomous mobile device to the first delivery destination based on the path.

13 Claims, 27 Drawing Sheets

(56) References Cited

U.S. PATENT DOCUMENTS

| | | | |
|---|---|---|---|
| 2005/0131645 A1* | 6/2005 | Panopoulos | G05D 1/0244 |
| | | | 701/472 |
| 2005/0246056 A1* | 11/2005 | Marks | B65G 57/245 |
| | | | 700/213 |
| 2006/0058921 A1* | 3/2006 | Okamoto | G05D 1/0214 |
| | | | 700/255 |
| 2007/0152619 A1* | 7/2007 | Sugiyama | B25J 9/1612 |
| | | | 318/568.12 |
| 2009/0012667 A1* | 1/2009 | Matsumoto | G05D 1/0261 |
| | | | 701/26 |
| 2009/0021351 A1* | 1/2009 | Beniyama | G06K 7/0008 |
| | | | 340/10.1 |
| 2010/0023252 A1* | 1/2010 | Mays | G01C 21/3423 |
| | | | 701/533 |
| 2012/0323431 A1* | 12/2012 | Wong | G01C 21/206 |
| | | | 701/25 |
| 2013/0110281 A1* | 5/2013 | Jones | G05D 1/00 |
| | | | 700/228 |
| 2013/0190963 A1* | 7/2013 | Kuss | G07C 5/0866 |
| | | | 701/23 |
| 2013/0325159 A1* | 12/2013 | Kilibarda | G05B 15/02 |
| | | | 700/114 |
| 2014/0309835 A1 | 10/2014 | Yamamoto | |
| 2016/0187886 A1* | 6/2016 | Jones | G06Q 50/28 |
| | | | 701/26 |
| 2016/0200438 A1* | 7/2016 | Bokeno | G05D 1/102 |
| | | | 244/2 |
| 2017/0097232 A1* | 4/2017 | Anderson-Sprecher | |
| | | | G05D 1/0274 |
| 2017/0109373 A1* | 4/2017 | Sung | G06F 16/29 |
| 2018/0300834 A1* | 10/2018 | High | B64C 39/024 |
| 2019/0271988 A1* | 9/2019 | High | G06Q 10/00 |

* cited by examiner

FIG. 6

| MARK ID | X | Y | DEGREE |
|---------|------|------|--------|
| 0001 | 8785 | 8514 | −152 |
| 0002 | 8739 | 5556 | −102 |
| 0003 | 8798 | 9674 | 141 |
| 0004 | 8866 | 9139 | 35 |

503

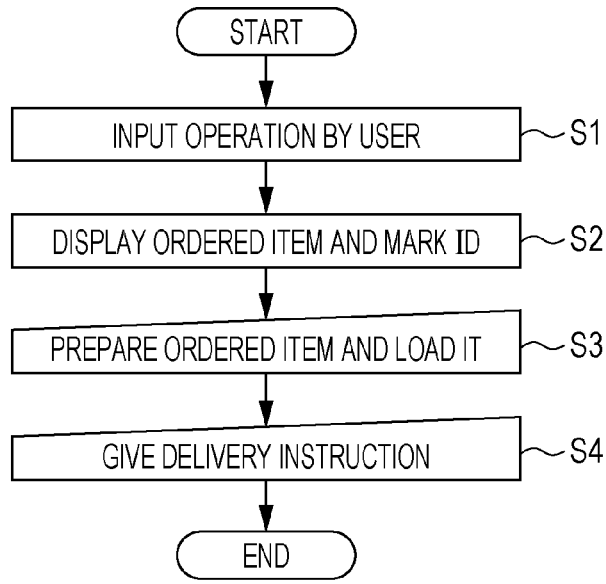
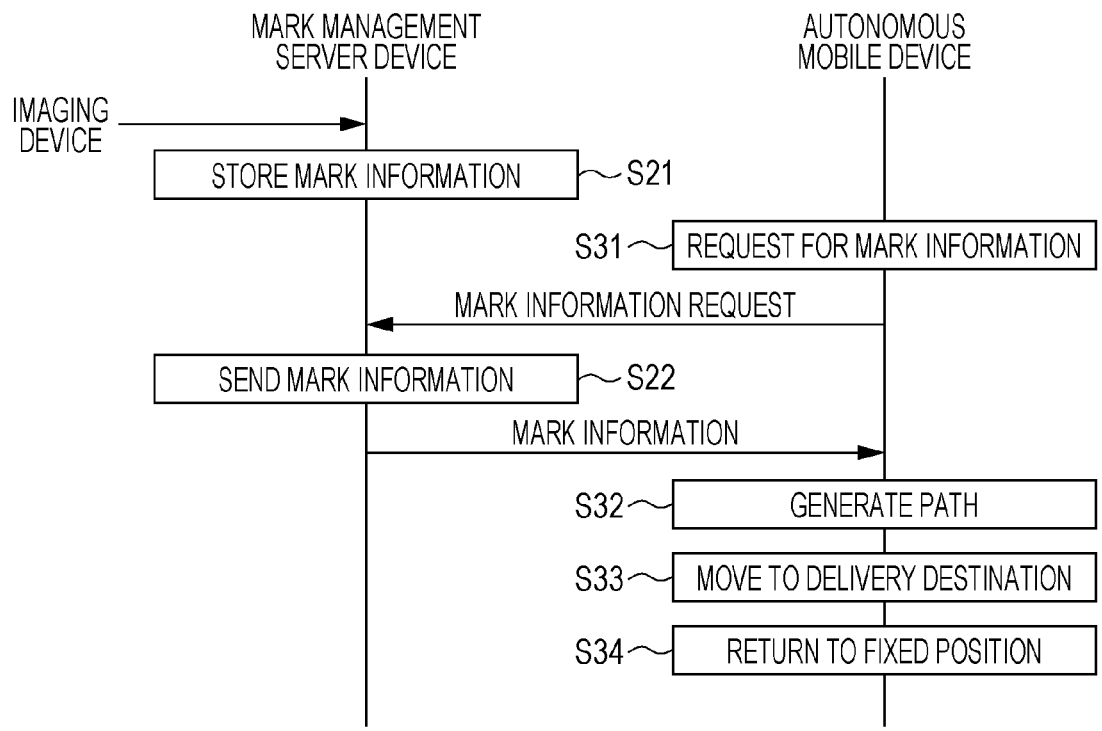

FIG. 13

| MARK ID | SHAPE | SIZE |
|---|---|---|
| 0001 | SQUARE | 100, 100, 100, 100 |
| 0002 | RECTANGLE | 100, 200, 100, 200 |
| 0003 | PERFECT CIRCLE | 100 |
| 0004 | TRIANGLE | 100, 200, 200 |

208

AUTONOMOUS MOBILE DEVICE, AUTONOMOUS DELIVERY SYSTEM, DELIVERY METHOD, AND NON-TRANSITORY RECORDING MEDIUM

BACKGROUND

1. Technical Field

The present disclosure relates to an autonomous mobile device, an autonomous delivery system, a delivery method, and a non-transitory recording medium.

2. Description of the Related Art

Autonomous mobile devices which move along predetermined paths within buildings, such as hospitals, factories, and commercial facilities, are now in practical use. Autonomous mobile devices are now actively used, particularly in delivery operations of specimens and drugs in hospitals, parts and components in factories, and food and drink in cafés and event venues. Areas where such autonomous mobile devices will be used in delivery operations are expected to expand.

A typical autonomous mobile device is provided with map information concerning a movable area of the autonomous mobile device and a position estimator for estimating the position of the autonomous mobile device so that it can autonomously move along a path from a start point to a goal point.

It is possible however that dynamic obstacles, such as humans, be present on a path on which the autonomous mobile device moves. The autonomous mobile device thus detects obstacles by using various sensors and moves from a start point to a goal point while stopping or avoiding obstacles in accordance with the situation.

Some autonomous mobile devices, not only move along a predetermined path, but also dynamically generate an optimal path from a start point to a goal point by detecting dynamic obstacles, such as humans, and move along the generated optimal path.

Japanese Unexamined Patent Application Publication No. 2014-209293, for example, discloses the following technology for controlling an autonomous mobile device. In a space, such as a café or an event venue, with dynamic obstacles, such as people, chairs, bags, and umbrellas, the autonomous mobile device moves while roughly calculating areas where dynamic obstacles are present by using a certain sensor and searching for a path with less dynamic obstacles based on the calculated areas. This technology enables the autonomous mobile device to move by avoiding areas where the autonomous mobile device is likely to encounter people, such as a cashier, a return counter, and an order counter in a café, for example.

SUMMARY

In one general aspect, the techniques disclosed here feature an autonomous mobile device including a mounter, a communicator, a map information storage, a mover, a path generator, and a moving controller. On the mounter, an item to be delivered is mounted. The communicator receives first mark information from a mark management server device. The first mark information is stored in a mark information storage of the mark management server device. The first mark information is sent from an imaging device that images a delivery area of the autonomous mobile device. The first mark information includes identification information concerning a first mark and position information indicating a position of the first mark in a map space. The first mark is attached to a first object placed within the delivery area. Upon receiving a new piece of the first mark information from the imaging device, the mark management server device updates the first mark information stored in the mark information storage to the received new piece of the first mark information. The map information storage stores map information concerning the delivery area. The mover moves the autonomous mobile device. The path generator sets the first object to which the first mark is attached as a first delivery destination and generates a path from a moving start position of the autonomous mobile device to the first delivery destination based on the first mark information and the map information. The moving controller controls the mover to move the autonomous mobile device will move to the first delivery destination based on the path.

According to an aspect of the present disclosure, even if the position of the first object, which is a delivery destination, is changed, it is possible to reliably deliver an item to the first object as the delivery destination.

It should be noted that general or specific embodiments may be implemented as a system, a method, an integrated circuit, a computer program, a computer-readable storage medium, such as compact disc-read only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates an example of mark information stored in a mark information storage according to the first embodiment;

FIG. 9 is a flowchart illustrating an example of processing to be executed when an order is placed from a user according to the first embodiment;

FIG. 10 is a sequence diagram illustrating an example of the operation of the mark management server device and the autonomous mobile device in the autonomous delivery system according to the first embodiment;

FIG. 13 illustrates an example of delivery destination information stored in a delivery destination information storage according to the second embodiment;

Figure 1:
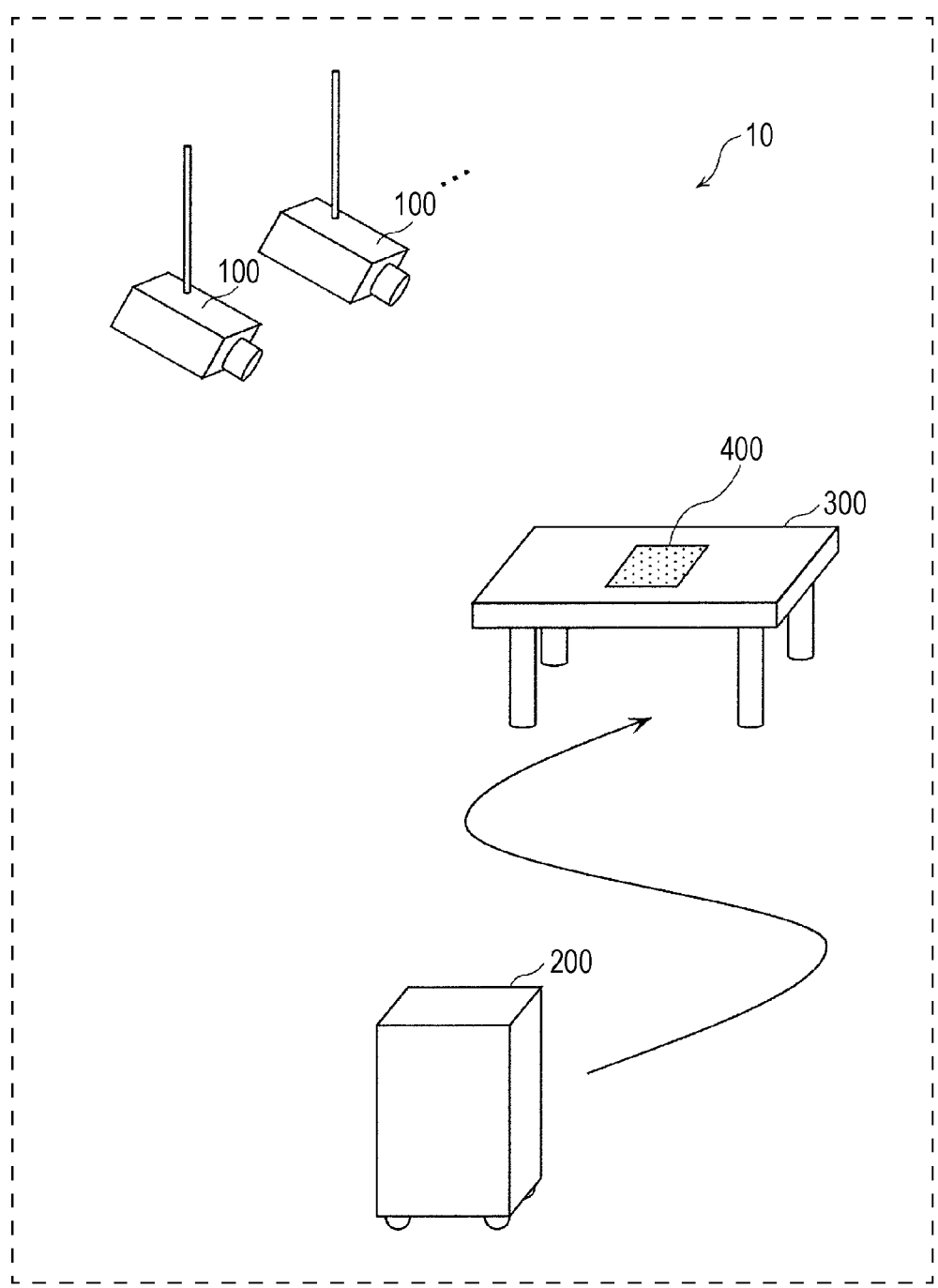
FIG. 1 is a schematic view illustrating an autonomous delivery system according to a first embodiment.

DETAILED DESCRIPTION (Underlying Knowledge Forming Basis of the Present Disclosure)

Nowadays, layout-free cafés and event venues where the layout of tables and chairs is not fixed but is freely changeable are increasing. It is thus desirable to generate a path by considering the presence of not only humans, but also other obstacles, and to move along the generated path. The above-described configuration of the related art enables an autonomous mobile device to move along a path while avoiding obstacles.

In a café, for example, the layout of tables during a breakfast-time period for which light meals are served and that during a lunchtime period may be different. The layout of tables during a dinnertime period in the evening may also be different from that in the morning or in the afternoon.

The technology disclosed in Japanese Unexamined Patent Application Publication No. 2014-209293 does not consider a situation where the layout of tables at a goal point is changed. If the layout of tables is changed, the autonomous mobile device fails to reach the goal point.

One non-limiting and exemplary embodiment provides an autonomous mobile device, an autonomous delivery system, a delivery method, and a non-transitory recording medium in which, even if the position of an object, which is a delivery destination, is changed, an item can be delivered to this object as the delivery destination.

An autonomous mobile device according to an aspect of the present disclosure, including:

a mounter on which an item to be delivered is mounted;

a communicator that receives first mark information from a mark management server device, the first mark information being stored in a mark information storage of the mark management server device, the first mark information being sent from an imaging device that images a delivery area of the autonomous mobile device to the mark management server device, the first mark information including identification information concerning a first mark and position information indicating a position of the first mark in a map space, the first mark being attached to a first object placed within the delivery area, upon receiving a new piece of the first mark information from the imaging device, the mark management server device updating the first mark information stored in the mark information storage to the received new piece of the first mark information;

a map information storage that stores map information concerning the delivery area;

a mover that moves the autonomous mobile device;

a path generator that sets the first object to which the first mark is attached as a first delivery destination, and generates a path from a moving start position of the autonomous mobile device to the first delivery destination based on the first mark information and the map information; and a moving controller that controls the mover so that the autonomous mobile device will move to the first delivery destination based on the path.

According to the above-described aspect of the disclosure, even if the position of the first object, which is the first delivery destination, is changed, an item can reliably be delivered to the first object as the first delivery destination.

While the autonomous mobile device is moving to the first delivery destination, if the communicator receives a new piece of the first mark information from the mark management server device, the path generator generates a new path from a current position of the autonomous mobile device to the first delivery destination, based on the new piece of the first mark information and the map information, and the moving controller controls the mover based on the new path.

With this configuration, even if the position of the first object, which is the first delivery destination, is changed while the autonomous mobile device is moving to the first delivery destination, an item can reliably be delivered to the first object as the first delivery destination.

Every time the imaging device images the delivery area to generate a new image, the imaging device generates, as a new piece of the first mark information, information including the identification information and position information indicating a position of the first mark in the map space, based on the new image, and the imaging device sends the new piece of the first mark information to the mark management server device.

With this configuration, every time the imaging device performs imaging to generate an image, the first mark information is generated from the image. Consequently, even if the position of the first object, which is the first delivery destination, is changed, an item can reliably be delivered to the first object as the first delivery destination.

An autonomous delivery system according to an aspect of the present disclosure, including:

an autonomous mobile device;
an imaging device; and
a mark management server device,
the imaging device including
an imager that images a delivery area of the autonomous mobile device so as to generate an image including a first mark,
a mark detector that reads identification information concerning the first mark from the image so as to detect a position of the first mark, the first mark being attached to a first object placed within the delivery area,
a coordinate transformer that transforms the position of the first mark included in the image into position information indicating a position of the first mark in a map space, and
a sender that sends first mark information including the identification information and the position information to the mark management server device,
the mark management server device including
a mark information storage that stores the first mark information received from the imaging device,
wherein, every time a new image is generated as a result of the imager imaging the delivery area,
the mark detector reads the identification information concerning the first mark from the new image so as to detect a new position of the first mark included in the new image,
the coordinate transformer transforms the new position of the first mark into position information indicating a new position of the first mark in the map space,
the sender sends a new piece of the first mark information including the identification information and the transformed position information to the mark management server device,
the mark management server device updates the first mark information stored in the mark information storage to the new piece of the first mark information received from the sender, and
upon receiving a request from the autonomous mobile device, the mark management server device reads the first mark information which is stored in the mark information storage when the request is received, and sends the read first mark information to the autonomous mobile device.

A delivery method according to an aspect of the present disclosure is a method using an autonomous mobile device including a mounter on which an item to be delivered is mounted. The method includes:

receiving first mark information from a mark management server device, the first mark information being stored in a mark information storage of the mark management server device, the first mark information being sent from an imaging device that images a delivery area of the autonomous mobile device to the mark management server device, the first mark information including identification information concerning a first mark and position information indicating a position of the first mark in a map space, the first mark being attached to a first object placed within the delivery area, upon receiving a new piece of the first mark information from the imaging device, the mark management server device updating the first mark information stored in the mark information storage to the received new piece of the first mark information;

setting the first object to which the first mark is attached as a first delivery destination and generating a path from a moving start position of the autonomous mobile device to the first delivery destination, based on the first mark information and map information concerning the delivery area stored in a map information storage of the autonomous mobile device; and controlling a mover to move the autonomous mobile device to the first delivery destination based on the path.

A non-transitory recording medium according to an aspect of the present disclosure stores a program which causes a computer to execute the delivery method.

The autonomous delivery system, the delivery method, and the non-transitory recording medium also achieve advantages similar to those obtained by the autonomous mobile device.

The autonomous mobile device according to an aspect of the present disclosure, further including:

a delivery destination information storage that stores first delivery destination information including the identification information concerning the first mark and information concerning a shape and a size of the first object; and a stop position calculator that calculates a stop position at which the autonomous mobile device is to stop in the first delivery destination, based on the first delivery destination information and the first mark information, wherein the path generator generates a path from the moving start position or a current position of the autonomous mobile device to the stop position as a path to the first delivery destination.

This configuration enables the autonomous mobile device to stop at the calculated stop position.

The imaging device also calculates an orientation of the first mark, and the imaging device sends, as the first mark information, information including the identification information concerning the first mark, the position information indicating a position of the first mark in the map space, and information indicating the orientation of the first mark to the mark management server device.

With this configuration, the communicator of the autonomous mobile device receives the first mark information also including information indicating the orientation of the first mark from the mark management server device. The autonomous mobile device can thus determine the orientation of the first delivery destination, such as the longitudinal direction of the first object, and stop at a more appropriate stop position in accordance with the shape of the first object.

The autonomous mobile device according to an aspect of the present disclosure, wherein:

the imaging device also includes
an orientation calculator that calculates an orientation of the first mark, and
a sender that sends, as the first mark information, information including the identification information concerning the first mark, the position information indicating a position of the first mark in the map space, and information indicating the orientation of the first mark to the mark management server device; and if the shape of the first object, which is the first delivery destination, is polygonal, the stop position calculator calculates a position of a corner of the first object, based on the first delivery destination information and the first mark information, and sets a position separated from the position of the corner of the first object by a first distance as the stop position.

Normally, if the first object is a polygonal table, it is less likely that dynamic obstacles, such as chairs, will be placed around the corners of the table. Consequently, the position separated from the position of the corner of the first object by the first distance is calculated as the stop position. The autonomous mobile device can thus stop at a more appropriate stop position in the first destination in accordance with the shape of the first object.

The stop position calculator calculates a position of an outer edge of the first object, which is the first delivery destination, based on the first delivery destination information and the first mark information, calculates a region defined by a second distance from the outer edge of the first object, and sets a position included in the region as the stop position.

A position within the region defined by the second distance from the outer edge of the first object and without obstacles can be set as the stop position. It is thus possible to calculate a more appropriate stop position in accordance with the shape of the first object, thereby enabling the autonomous mobile device to stop at a more appropriate stop position.

The autonomous mobile device according to an aspect of the present disclosure, wherein the stop position calculator calculates positions of a plurality of the corners of the first object, which is the first delivery destination, calculates positions separated from the positions of the plurality of corners of the first object by the first distance as a plurality of stoppable positions, selects a closest stoppable position to the moving start position of the autonomous mobile device from among the plurality of stoppable positions, and sets the selected stoppable position as the stop position.

This configuration enables the autonomous mobile device to deliver an item to the first destination by using a shorter distance, thereby enhancing the operation efficiency of the autonomous delivery system.

The autonomous mobile device according to an aspect of the present disclosure, further including:

an obstacle detector that detects an obstacle, wherein, if an obstacle is detected at the stop position by the obstacle detector, the stop position calculator selects a closest stoppable position to a current position of the autonomous mobile device from among the plurality of stoppable positions other than the previously selected stoppable position, and sets the selected closest stoppable position as the stop position.

With this configuration, even if the autonomous mobile device fails to reach a stoppable position set as a stop position, it selects the closest stoppable position to the current position of the autonomous mobile device as a new stop position from among a plurality of stoppable positions except for the previously selected stoppable position. The autonomous mobile device can thus move to the new stop position and deliver an item to the first delivery destination.

The autonomous mobile device according to an aspect of the present disclosure, further including:

an obstacle detector that detects an obstacle, wherein, if an obstacle is detected in a region including the stop position by the obstacle detector, the stop position calculator calculates a position of an outer edge of the first object, which is the first delivery destination, based on the first delivery destination information and the first mark information, calculates a region defined by a second distance from the outer edge of the first object, and sets a position included in the region as the stop position.

With this configuration, even if the autonomous mobile device fails to reach a stop position, a position within the region defined by the second distance from the outer edge of the first object, which is the first delivery destination, is calculated as a new stop position. The autonomous mobile device can thus move to the new stop position and reliably deliver an item to the first delivery destination.

The autonomous mobile device according to an aspect of the present disclosure, further including:

a time counter that counts a time elapsed from a predetermined timing, wherein the map information storage also stores information indicating a first position that the autonomous mobile device is able to reach without being influenced by obstacles, and if the autonomous mobile device fails to reach the first delivery destination within a predetermined time, the path generator sets the first position as a new stop position and generates a path from a current position of the autonomous mobile device to the new stop position as a path to the first delivery destination.

With this configuration, if the autonomous mobile device fails to reach a stop position within the predetermined time, the first position, which is a position at which the autonomous mobile device can reach without being influenced by obstacles, is set as a new stop position, thereby enabling the autonomous mobile device to reliably reach the new stop position to deliver an item.

The autonomous mobile device according to an aspect of the present disclosure, wherein:

the map information storage also stores information indicating a second position that the autonomous mobile device is able to reach without being influenced by obstacles; and if the autonomous mobile device fails to reach the first delivery destination within the predetermined time, the path generator sets one of the first and second positions that is closer to the stop position as the new stop position.

This configuration enables the autonomous mobile device to reliably reach a new stop position which is not influenced by obstacles to deliver an item and also to suppress a decrease in the operation efficiency of the autonomous mobile device.

The autonomous mobile device according to an aspect of the present disclosure, wherein:

the map information storage also stores information indicating a second position that the autonomous mobile device is able to reach without being influenced by obstacles; and if the autonomous mobile device fails to reach the first delivery destination within the predetermined time, the path generator sets one of the first and second positions that is closer to a current position of the autonomous mobile device as the new stop position.

This configuration enables the autonomous mobile device to reliably reach a new stop position which is not influenced by obstacles to deliver an item and also to suppress a decrease in the operation efficiency of the autonomous mobile device.

The autonomous mobile device according to an aspect of the present disclosure, wherein:

the stop position calculator also calculates a stop direction in which the autonomous mobile device is to face when the autonomous mobile device stops; and the moving controller causes the autonomous mobile device to stop facing in the calculated stop direction when the autonomous mobile devices reaches the first delivery destination.

With this configuration, if the direction in which a user can easily remove a delivered item is calculated as a stop direction, when the autonomous mobile device reaches a delivery destination and stops in the calculated stop direction, the convenience to the user is enhanced.

The autonomous mobile device according to an aspect of the present disclosure, wherein:

second mark information sent from the imaging device is stored in the mark information storage of the mark management server device, the second mark information including identification information concerning a second mark and position information indicating a position of the second mark in the map space, the second mark being attached to a second object placed within the delivery area, upon receiving a new piece of the second mark information from the imaging device, the mark management server device updates the second mark information stored in the mark information storage to the received new piece of the second mark information; and if the autonomous mobile device stops at a position in the first delivery destination, the communicator receives the second mark information from the mark management server device, the path generator sets the second object as a second delivery destination and generates a path from the position in the first delivery destination at which the autonomous mobile device stops to the second delivery destination, based on the second mark information and the map information, and the moving controller controls the mover to move the autonomous mobile device to the second delivery destination based on the path.

After the autonomous mobile device has delivered an item to the first delivery destination, the path generator generates a path from the position at which the autonomous mobile device has stopped to the second delivery destination. This configuration enables the autonomous mobile device to deliver an item to the second delivery destination based on the generated path after delivering an item to the first delivery destination. The autonomous mobile device can thus sequentially deliver items to plural delivery destinations, thereby enhancing the operation efficiency of the autonomous mobile device.

It should be noted that general or specific embodiments may be implemented as a system, a method, an integrated circuit, a computer program, a computer-readable storage medium, such as a CD-ROM, or any selective combination thereof.

Embodiments of the present disclosure will be described below in detail with reference to the accompanying drawings. All of the embodiments described below illustrate desirable specific examples of the present disclosure. Numeric values, shapes, materials, components, positions and connection states of the components, steps, and the order of steps illustrated in the following embodiments are only examples, and are not described for limiting the present disclosure. Among the components illustrated in the following embodiments, the components that are not recited in the independent claims which embody the broadest concept of the present disclosure will be described as optional components.

The drawings are only schematically illustrated and do not necessarily illustrate the components precisely. In the drawings, the components having substantially the same configuration are designated by like reference numeral, and a repeated explanation thereof will be omitted or simplified.

First Embodiment

[Autonomous Delivery System]

FIG. 1 is a schematic view illustrating an autonomous delivery system 10 according to a first embodiment.

As shown in FIG. 1, the autonomous delivery system 10 generates a path to a delivery destination 300 in a predetermined delivery area from images captured by imaging devices 100. More specifically, the autonomous mobile device 200 generates a path from a current position of the autonomous mobile device 200 to the delivery destination 300, which is a goal point, and delivers an item to the delivery destination 300 based on the generated path. The autonomous mobile device 200 includes a mounting portion (not shown) on which an item to be delivered is mounted.

The predetermined delivery area is an area in a café, a restaurant, a fast food restaurant, a food court, an office, an amusement arcade, a casino, an event space, a break room, a factory, a hospital, or a school where the autonomous mobile device 200 is able to deliver items. The delivery destination 300 is an object, such as a table, a chair, a shelf, or a storage container, placed within the predetermined delivery area, or a person located within the predetermined delivery area. When the autonomous mobile device 200 reaches the delivery destination 300, delivering of an item by the autonomous mobile device 200 is completed. That is, the delivery destination 300 is a goal point, namely, a destination, a target object, a target region, and a target point, for the autonomous mobile device 200 moving while carrying an item. Examples of items carried by the autonomous mobile device 200 are drinks, plates with food, documents, stationery, coins, distributed matters, tools, materials, components, and drugs.

The autonomous delivery system 10 according to the first embodiment includes a mark 400, a delivery destination 300, one or more imaging devices 100, and an autonomous mobile device 200.

In the first embodiment, the predetermined delivery area is a café, the delivery destination 300 is a table placed in a café on which the mark 400 is disposed, and items to be carried are drinks, such as coffee. However, these are only examples. The present disclosure is not restricted to those discussed above. For example, two or more tables, that is, two or more delivery destinations 300, are placed in a café. In this case, mark IDs of the marks 400 disposed on the two tables are different from each other. Details of the mark ID will be discussed later.

Figure 2:
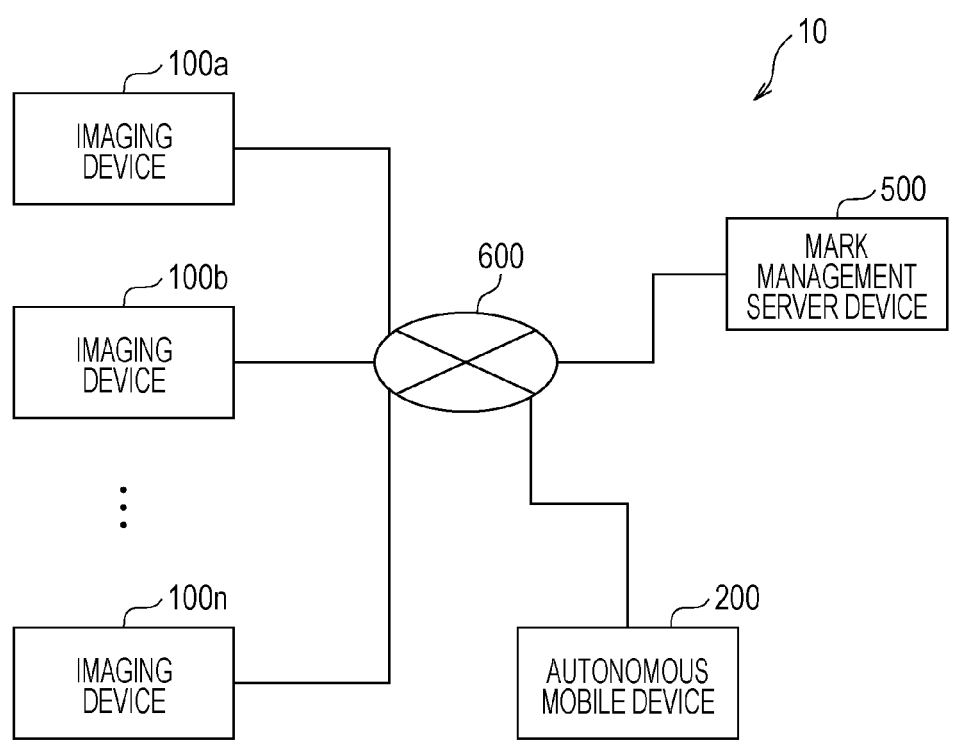
FIG. 2 is a block diagram illustrating an example of the autonomous delivery system according to the first embodiment.

FIG. 2 is a block diagram illustrating an example of the autonomous delivery system 10 according to the first embodiment.

As shown in FIG. 2, imaging devices 100a through 100n (hereinafter may simply be called an imaging device 100 or imaging devices 100), an autonomous mobile device 200, a mark management server device 500 are connected to one another via a network 600.

The network 600 is a wireless network or a wired network. Examples of the wireless network are a wireless local area network (LAN), a wireless wide area network (WAN), the 3rd Generation mobile communication system (3G), Long Term Evolution (LTE), and Wireless Gigabit (WiGig). Examples of the wired network are an intranet and the Internet.

[Mark]

Figure 3:
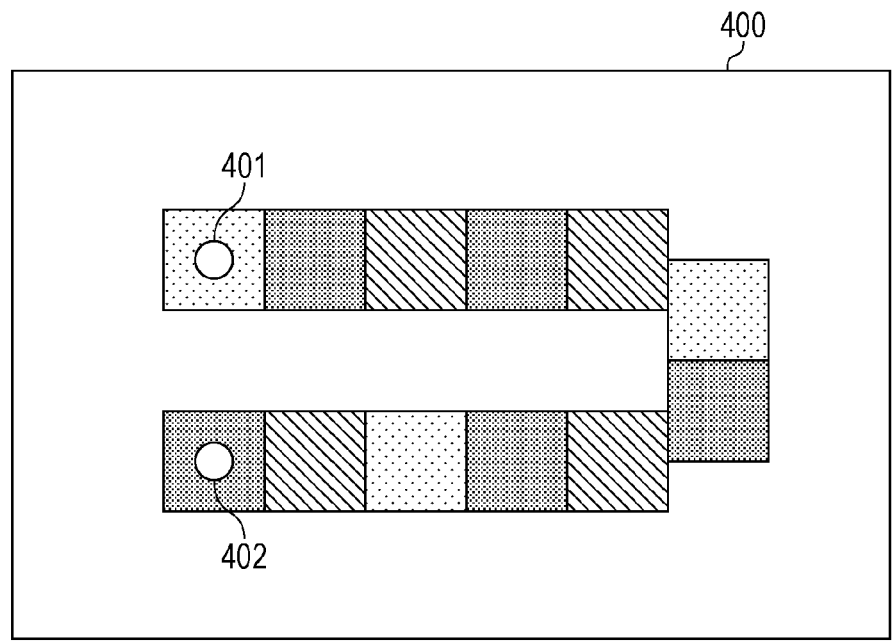
FIG. 3 illustrates an example of a mark according to the first embodiment.

FIG. 3 illustrates an example of the mark 400 according to the first embodiment.

As shown in FIG. 3, the mark 400 is a sheet-like or three-dimensional display medium on which mark information for identifying the mark 400 is displayed. The mark 400 is disposed on the top surface of the delivery destination 300, which is a table. The mark 400 may be any type of medium that can display mark information, and may be a panel, a film, or a display. The mark 400 may be printed on a table.

The mark information is information generated by coding a unique mark ID. Examples of the mark information are geometric information indicating a predetermined display mode and code information, for example, linear code such as Japanese Article Number (JAN) code, European Article Number (EAN) code, and Interleaved Two of Five (ITF) code and two-dimensional code such as Quick Response (QR) code (registered trademark) and color code. The mark ID is an example of identification information.

In the first embodiment, as the mark information, a mark ID generated by coding the table number of a table, which is the delivery destination 300, is used. The mark information may be character string information indicating a mark ID using at least one of characters, a number, and a symbol. The mark ID is an example of identification information for identifying a delivery destination, and is stored in association with the mark 400.

The imaging device 100 is installed at a position at which it can image a table, which is the delivery destination 300, from above.

The mark 400 has base points including a start point and an end point. The base points are recognizable from an image captured by the imaging device 100. The base points are determined based on the outer configuration of the mark 400. More specifically, as shown in FIG. 3, a start point 401 is a base point of a geometric configuration representing code information and serves as the start position of the mark 400, while an end point 402 is a base point of a geometric configuration representing code information and serves as the end position of the mark 400. If the outer configuration of the mark 400 is substantially a rectangle, the vertices of the individual corners of the mark 400 may be used as base points.

[Imaging Device]

The configuration of the imaging device 100 will be discussed below in detail.

Figure 4:
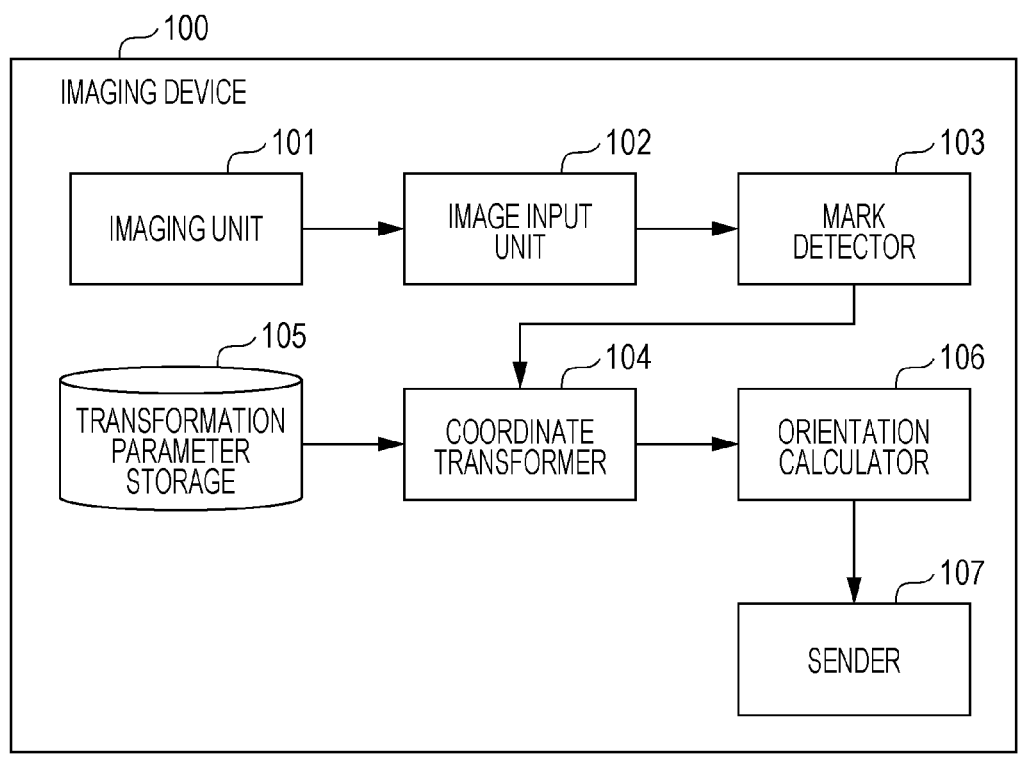
FIG. 4 is a block diagram illustrating an example of an imaging device according to the first embodiment.

FIG. 4 is a block diagram illustrating an example of the imaging device 100 according to the first embodiment.

Plural imaging devices 100 are installed within the predetermined delivery area and image the delivery destination 300 so as to generate images including the mark 400. The imaging devices 100 repeatedly image the delivery destination 300, and every time the imaging devices 100 image the delivery destination 300, they send mark information obtained from generated images to the mark management server device 500. If there are plural marks 400, the plural imaging devices 100 may perform imaging and identify the plural marks 400 based on a one-to-one correspondence. That is, one imaging device 100 is associated with one mark 400. Alternatively, one imaging device 100 may perform imaging and identify the plural marks 400. Each of the imaging devices 100 can image the entirety of the predetermined delivery area. The imaging devices 100 are cameras for reading the mark 400, such as network cameras or pan-tilt-zoom (PTZ) cameras. The configurations of the plural imaging devices 100 are the same, and only one imaging device 100 will be explained.

As shown in FIG. 4, the imaging device 100 includes an imaging unit 101, an image input unit 102, a mark detector 103, a coordinate transformer 104, a transformation parameter storage 105, an orientation calculator 106, and a sender 107.

The imaging unit 101 includes at least a lens and an image sensor. The lens causes light (light rays) incident from the outside of the imaging device 100 to converge and forms an optical image on a predetermined imaging plane of the image sensor. The image sensor, which is a charge coupled device (CCD) or a complementary metal oxide semiconductor (CMOS) solid-state imaging element, converts the optical image formed on the predetermined imaging plane into an electric signal. The imaging unit 101 outputs this electric signal to the image input unit 102.

The image input unit 102 performs predetermined signal processing on the electric signal received from the imaging unit 101 so as to generate data (frame) indicating an image represented by RGB (red, green, and blue) or YUV (the brightness (Y), a difference between the brightness and blue components (U), and a difference between the brightness and red components (V)) that are visible to the human eye. The image input unit 102 outputs the generated data indicating the image generated by the imaging unit 101 to the mark detector 103. The image input unit 102 is constituted by a central processing unit (CPU), a micro processing unit (MPU), or a digital signal processor (DSP), for example.

The mark detector 103 detects the mark 400 from the image indicated by the received data. The mark detector 103 then detects the unique mark ID and the positions of the base points in an image space from the detected mark 400. The mark detector 103 then outputs information indicating the unique mark ID and the positions of the base points to the coordinate transformer 104. For detecting the mark 400, a known reading technique or image matching technique may be used in accordance with the type of mark 400. The mark detector 103 is constituted by a CPU, an MPU, a DSP, an application specific integrated circuit (ASIC), or a field programmable gate array (FPGA), for example.

The coordinate transformer 104 transforms the position of the mark 400 included in the image into position information indicating the position of the mark 400 in a map space. That is, by using a transformation matrix H, which is a transformation parameter for transforming coordinates, stored in the transformation parameter storage 105, the coordinate transformer 104 transforms the image spatial coordinates of the base points of the mark 400 included in the image into map spatial coordinates. The coordinate transformer 104 then outputs data indicating the transformed map spatial coordinates to the orientation calculator 106. The coordinate transformer 104 is constituted by a CPU, an MPU, a DSP, an ASIC, or an FPGA, for example. The map spatial coordinates are an example of position information indicating a position of a mark in a map space.

Transformation from the image spatial coordinates into the map spatial coordinates will be discussed below.

A point p(x, y, 1) on a plane in a certain space is transformed into a point P(X, Y, 1) on a plane in another space by using the transformation matrix H according to equation (1).

$$P = \begin{bmatrix} X \\ Y \\ 1 \end{bmatrix} = Hp = \begin{bmatrix} h11 & h12 & h13 \\ h21 & h22 & h23 \\ h31 & h32 & 1 \end{bmatrix} \begin{bmatrix} x \\ y \\ 1 \end{bmatrix} \quad (1)$$

The transformation matrix H is represented by $$\begin{bmatrix} h11 & h12 & h13 \\ h21 & h22 & h23 \\ h31 & h32 & 1 \end{bmatrix}$$

in equation (1).

In equation (1), by using the transformation matrix H, a plane in a certain space can be projected onto a plane in another space. The coordinates projected onto a plane in another space may be calculated by using equations (2) and (3) based on equation (1).

$$X = \left[ \frac{x*h11 + y*h12 + h13}{x*h31 + y*h32 + 1} \right] \quad (2)$$

$$Y = \left[ \frac{x*h21 + y*h22 + h23}{x*h31 + y*h32 + 1} \right] \quad (3)$$

Equations (2) and (3) are respectively expanded to equations (4) and (5).

$$X = x*h11 + y*h12 + h13 - x*h31*X - y*h32*X \quad (4)$$

$$Y = x*h21 + y*h22 + h23 - x*h31*Y + y*h32*Y \quad (5)$$

The eight unknowns h11 to h32 can be found by solving eight-dimensional simultaneous linear equations expressed by equations (6) through (13) by using the coordinates of four points before transformation and the coordinates of four points after transformation.

$$X1 = x*h11 + y*h12 + h13 - x*h31*X1 - y*h32*X1 \quad (6)$$

$$Y1 = x*h21 + y*h22 + h23 - x*h31*Y1 + y*h32*Y1 \quad (7)$$

$$X2 = x*h11 + y*h12 + h13 - x*h31*X2 - y*h32*X2 \quad (8)$$

$$Y2 = x*h21 + y*h22 + h23 - x*h31*Y2 + y*h32*Y2 \quad (9)$$

$$X3 = x*h11 + y*h12 + h13 - x*h31*X3 - y*h32*X3 \quad (10)$$

$$Y3 = x*h21 + y*h22 + h23 - x*h31*Y3 + y*h32*Y3 \quad (11)$$

$$X4 = x*h11 + y*h12 + h13 - x*h31*X4 - y*h32*X4 \quad (12)$$

$$Y4 = x*h21 + y*h22 + h23 - x*h31*Y4 + y*h32*Y4 \quad (13)$$

The coordinates pj(xj, yj) in an image space can be transformed into the coordinates Pj(Xj, Yj) in a real space, based on Pj=Hpj, by calculating the transformation matrix H by using four points pj(xj, yj) in the image space and the associated four points Pj(Xj, Yj) in the real space.

The transformation parameter storage 105 stores a transformation parameter for transforming the image spatial coordinates into predetermined map spatial coordinates by the coordinate transformer 104. The transformation parameter is a transformation matrix used in projective transformation, for example. The transformation parameter storage 105 is constituted by a semiconductor memory or a hard disk drive, for example.

The orientation calculator 106 calculates the orientation of the mark 400 with respect to the map spatial coordinates by using the coordinates of the start point 401 and those of the end point 402, which are two base points. Calculating of the orientation of the mark 400 can calculate the orientation of the table on which the mark 400 is disposed. More specifically, the orientation calculator 106 calculates the orientation of the mark 400 from a vector directing from the start point 401 to the end point 402 based on the coordinates of the start point 401 and those of the end point 402. If the shape of the delivery destination 300, which is a table, does not change no matter from which orientation it is viewed, such as when the shape of the table is a perfect circle as viewed from above, calculating of the orientation of the mark 400 by the orientation calculator 106 may be omitted. The orientation calculator 106 is constituted by a CPU, an MPU, a DSP, an ASIC, or an FPGA, for example. In the above-described example, the position of the mark 400 attached to a table, which is the delivery destination 300, is transformed into a position in a map space. However, this is only an example. If the mark 400 is attached to a chair in a café, the position and the orientation of the chair in a map space may be detected. If the mark 400 is attached to the autonomous mobile device 200, the position and the orientation of the autonomous mobile device 200 in a map space may be detected. In this case, the mark ID of the mark 400 attached to the table, that to the chair, and that to the autonomous mobile device 200 are different from each other.

The sender 107 includes a communication circuit that performs wireless communication or wired communication. The sender 107 sends mark information obtained by the imaging unit 101 from the mark 400 to the mark management server device 500. The mark information includes at least the mark ID and coordinate information. The coordinate information indicates the coordinates of the base points in a map space transformed from those in an image space by the coordinate transformer 104 and the center coordinates of the mark 400 calculated from the coordinates of the base points, for example. If the orientation of the mark 400 is calculated by the orientation calculator 106, the mark information also indicates the calculated orientation.

[Mark Management Server Device]

The configuration of the mark management server device 500 will now be discussed.

Figure 5:
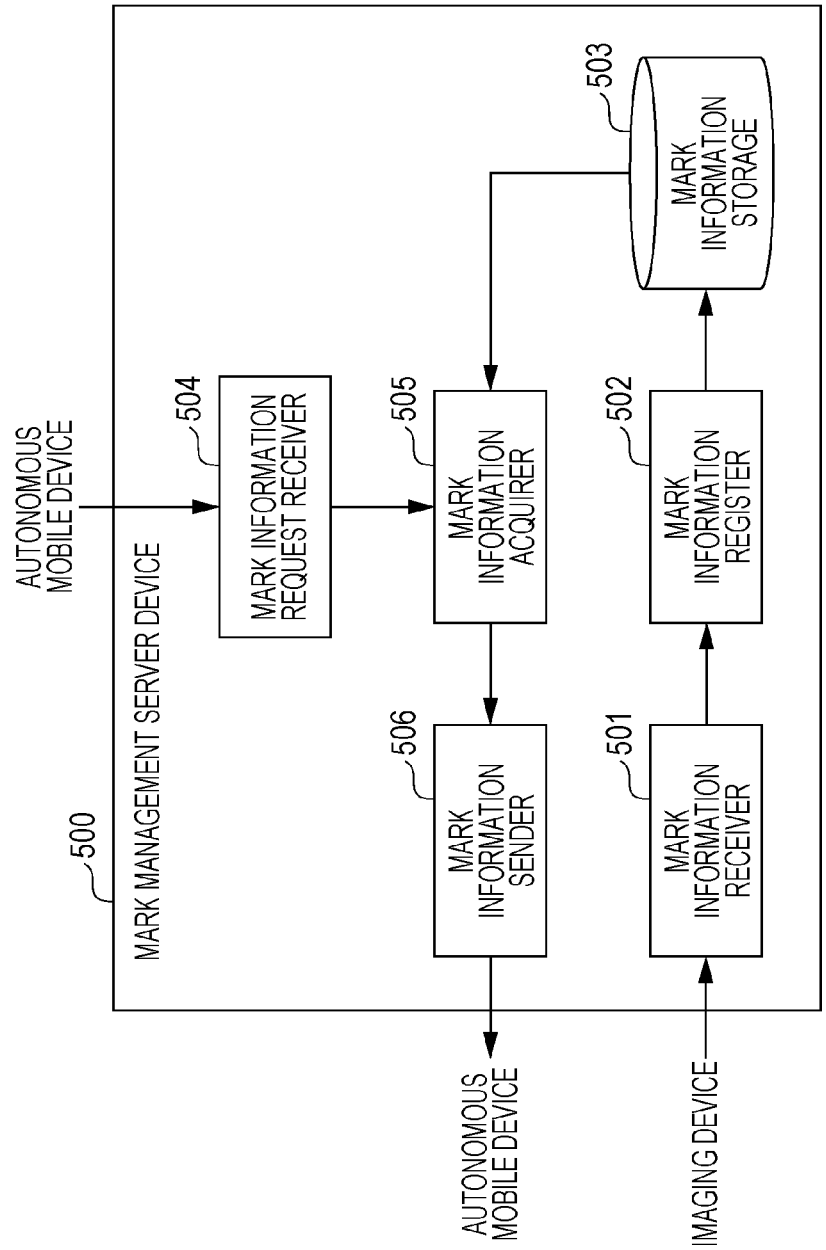
FIG. 5 is a block diagram illustrating an example of a mark management server device according to the first embodiment.

FIG. 5 is a block diagram illustrating an example of the mark management server device 500 according to the first embodiment.

The mark management server device 500 includes a communication function of communicating with the imaging device 100 and the autonomous mobile device 200 via the network 600 and a storage region for storing various items of information. The mark management server device 500 is a server constituted by a personal computer (PC), for example.

As shown in FIG. 5, the mark management server device 500 includes a mark information receiver 501, a mark information register 502, a mark information storage 503, a mark information request receiver 504, a mark information acquirer 505, and a mark information sender 506.

The mark information receiver 501 is constituted by a communication circuit that performs wireless communication or wired communication. The mark information receiver 501 receives mark information sent from the imaging device 100 and outputs the mark information to the mark information register 502.

The mark information register 502 outputs the mark information received from the mark information receiver 501 to the mark information storage 503 and causes the mark information storage 503 to store the mark information. The mark information register 502 is constituted by a CPU or an MPU, for example.

The mark information storage 503 is constituted by a semiconductor memory or a hard disk drive, for example, and stores mark information. Mark information stored in the mark information storage 503 will be discussed below with reference to FIG. 6.

FIG. 6 illustrates an example of mark information stored in the mark information storage 503 according to the first embodiment.

As shown in FIG. 6, the mark information stored in the mark information storage 503 at least includes information indicating mark IDs. The mark information also indicates X and Y, which are respectively an X coordinate and a Y coordinate of the center point of the mark 400 in a map space, and Degree, which is the angle of the mark 400 with respect to the map spatial coordinates. The mark information may indicate the X coordinate and the Y coordinate of each of the base points of the mark 400 in a map space. The X coordinate and the Y coordinate in a map space are two-dimensional coordinates in a plan view of a map.

The center point of the mark 400 is calculated in the following manner. The vertices of the four corners of the mark 400 having a rectangular shape are set as p1(x1, y1), p2(x2, y2), p3(x3, y3), and p4(x4, y4). The center point of the mark 400 can be determined by using the coordinates of the four points p1(x1, y1), p2(x2, y2), p3(x3, y3), and p4(x4, y4).

Referring back to FIG. 5, the mark information request receiver 504 is constituted by a communication circuit that performs wireless communication or wired communication. The mark information request receiver 504 receives a mark information request from the autonomous mobile device 200 and sends a request to acquire mark information to the mark information acquirer 505.

In response to a request from the mark information request receiver 504, the mark information acquirer 505 acquires a predetermined piece of mark information from the mark information storage 503 and outputs the acquired piece of mark information to the mark information sender 506. The mark information acquirer 505 may acquire all pieces of mark information stored in the mark information storage 503 or may acquire a piece of mark information only associated with a specified mark ID. The mark information acquirer 505 is constituted by a CPU or an MPU, for example.

The mark information sender 506 is constituted by a communication circuit that performs wireless communication or wired communication, and sends mark information received from the mark information acquirer 505 to the autonomous mobile device 200.

[Autonomous Mobile Device]

The configuration of the autonomous mobile device 200 will now be discussed below.

Figure 7:
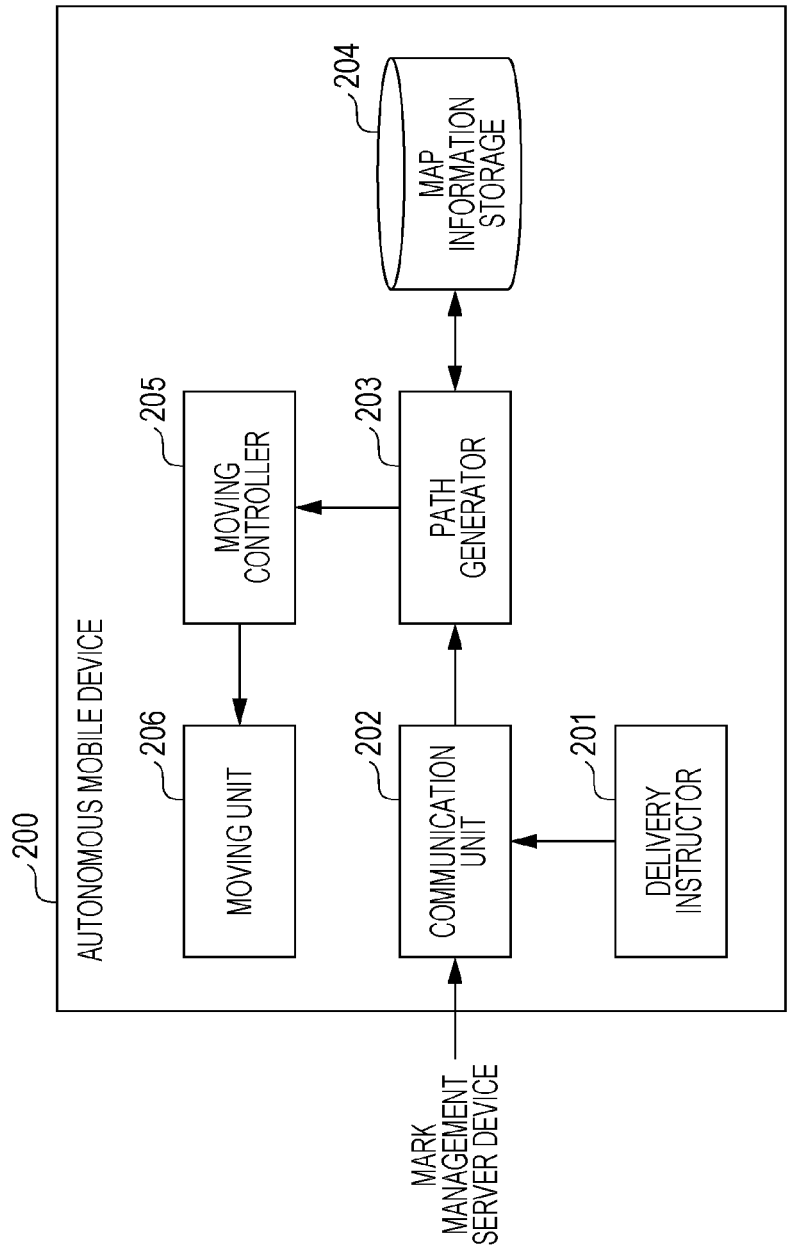
FIG. 7 is a block diagram illustrating an example of an autonomous mobile device according to the first embodiment.

FIG. 7 is a block diagram illustrating an example of the autonomous mobile device 200 according to the first embodiment.

The autonomous mobile device 200 is a robot or a vehicle which autonomously moves from a predetermined start position to a delivery destination 300 to deliver an item there. The predetermined start position is a kitchen in a restaurant or a counter in a café, for example. The predetermined start position is also called a moving start position. As shown in FIG. 7, the autonomous mobile device 200 includes a delivery instructor 201, a communication unit 202, a path generator 203, a map information storage 204, a moving controller 205, and a moving unit 206.

The delivery instructor 201 is an input unit which is constituted by a mouse and a keyboard, a touch panel, a touch pad, or a certain button and which outputs a signal generated as a result of a user performing an input operation to the communication unit 202. The input operation is an operation for specifying a delivery destination 300 of the autonomous mobile device 200, for example. In a café, for example, when a drink order is received from a customer, the staff in the café operates the delivery instructor 201 to input the table number of the table of the customer as the delivery destination 300 so that the autonomous mobile device 200 can deliver the ordered drink to this table. The table number is an example of a mark ID.

The communication unit 202 is constituted by a communication circuit that performs wireless communication or wired communication. The communication unit 202 communicates with the mark management server device 500 in accordance with an input operation by a user using the delivery instructor 201 and repeatedly receives mark information from the mark information acquirer 505 via the mark information sender 506 of the mark management server device 500. The communication unit 202 then outputs the received mark information to the path generator 203.

The path generator 203 is constituted by a CPU or an MPU, for example. The path generator 203 repeatedly generates a path to the delivery destination 300 based on mark information received by the communication unit 202 from the mark management server device 500 and map information stored in the map information storage 204. The path generator 203 then outputs information indicating the generated path to the moving controller 205. When generating a path from a moving start position to a delivery destination 300, the path generator 203 generates a path connecting multiple relay points from the moving start position to a table, which is the delivery destination 300, by avoiding static obstacles indicated by the map information. Dynamic obstacles, such as humans, may exist on the generated path. In this case, if such dynamic obstacles do not move for a certain period of time, the path generator 203 may generate a path again by avoiding such dynamic obstacles.

The map information storage 204, which stores map information, also stores information indicating a path generated by the path generator 203. The map information may be a map in the above-described map space. The map information includes coordinate information concerning an area where the autonomous mobile device 200 is movable, such as coordinate information concerning static obstacles. The map information storage 204 is constituted by a semiconductor memory or a hard disk drive, for example.

The moving controller 205 is constituted by a CPU or an MPU, for example. The moving controller 205 obtains information indicating a path generated by the path generator 203 and controls the moving unit 206 based on the generated path indicated by this information. That is, the moving controller 205 controls the moving unit 206 so that the autonomous mobile device 200 can deliver an item to the delivery destination 300 based on the generated path.

The moving unit 206 is an actuator constituted by a motor driven by batteries and a driving wheel driven by the motor, for example. As a result of the moving controller 205 controlling the revolution number and the revolution speed of the actuator, the moving unit 206 moves while the moving controller 205 is calculating the moving distance and direction. This allows the autonomous mobile device 200 to calculate the current position while moving. As a result, the autonomous mobile device 200 can move in accordance with the generated path.

[Operation]

The operation of the autonomous delivery system 10 according to the first embodiment will be described below.

The operation of the imaging device 100 and the mark management server device 500 in the autonomous delivery system 10 will first be discussed below with reference to FIG. 8.

Figure 8:
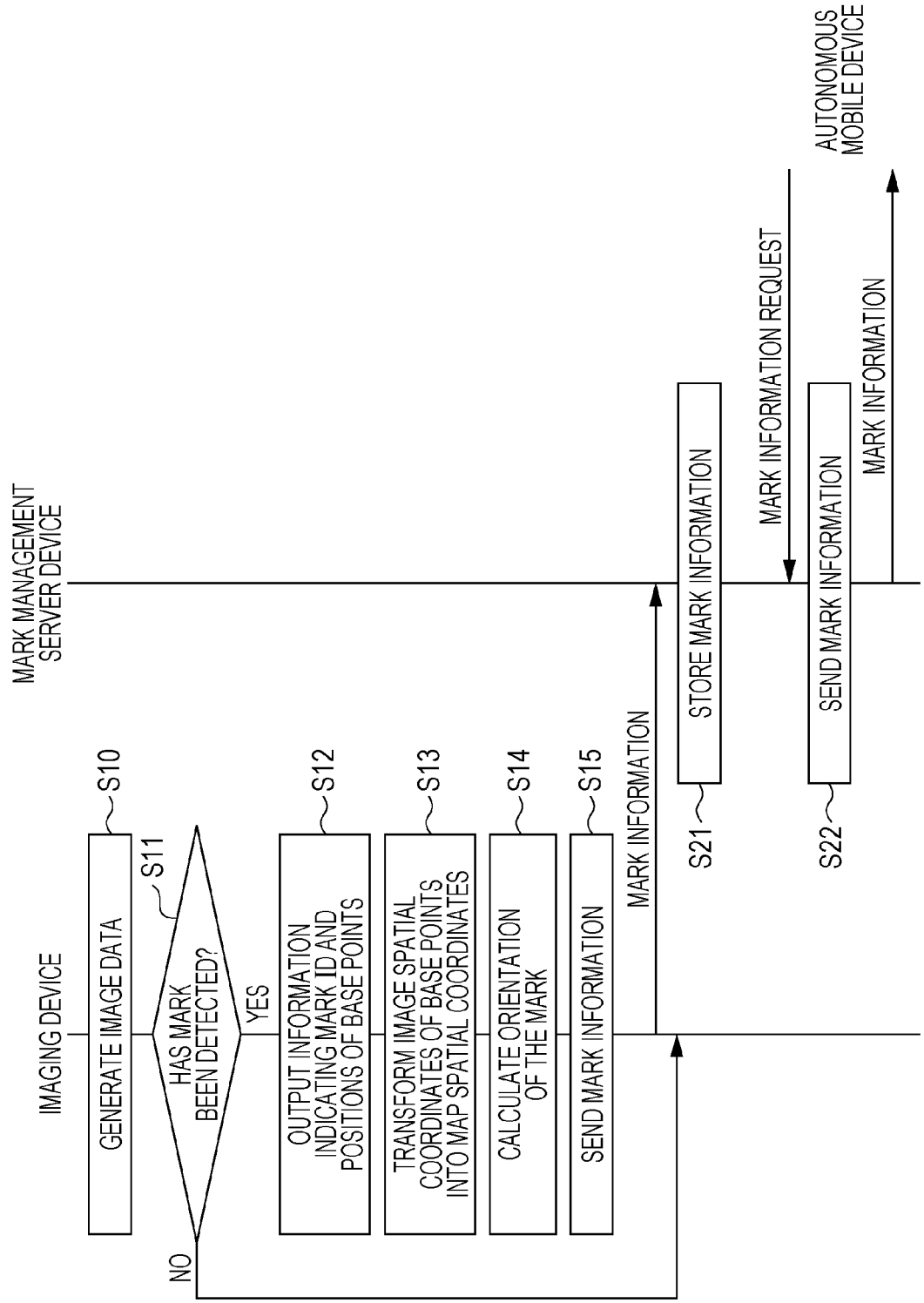
FIG. 8 is a sequence diagram illustrating an example of the operation of the imaging device and the mark management server device in the autonomous delivery system according to the first embodiment.

FIG. 8 is a sequence diagram illustrating an example of the operation of the imaging device 100 and the mark management server device 500 in the autonomous delivery system 10 according to the first embodiment.

In step S10, the imaging device 100 images a café, which is a delivery area, from above, so as to generate an image. The image input unit 102 of the imaging device 100 generates image data from information indicating the image. The delivery area includes a mark 400 disposed on a table of a user, which is a delivery destination 300. The generated image data indicating the image thus includes an image of the mark 400. The image input unit 102 outputs the image data to the mark detector 103. The image input unit 102 regularly generates image data at a predetermined frame rate. For each frame, the following processing is performed.

In step S11, the mark detector 103 executes processing for detecting the mark 400 from the input image data. The mark detector 103 determines whether the mark 400 has been detected. To detect the mark 400, image matching between the input image data and image information indicating individual marks 400 is executed.

If the mark 400 has not been detected (NO in step S11), processing for this frame is terminated. This is because the mark detector 103 has failed to specify a delivery destination 300 to which an item will be delivered, and thus, the entire processing is terminated. Alternatively, the process may return to step S10, and the imaging device 100 may image the mark 400 and generate image data again.

The mark 400 may be detected by using a technique other than image matching. The mark 400 is code information such as linear code or two-dimensional code such as QR code (registered trademark) or color code. The mark detector 103 may thus recognize barcode information to detect the mark 400.

If the mark 400 has been detected (YES in step S11), the mark detector 103 detects the mark ID and the coordinates of the base points of the mark 400 in step S12. The mark detector 103 then outputs information indicating the mark ID and the coordinates of the base points to the coordinate transformer 104. If image matching has been used for detecting the mark 400, the mark detector 103 obtains position information concerning the base points of the mark 400 included in the input image data and also obtains the mark ID related to the image information concerning a matched mark 400. The mark detector 103 may alternatively obtain the embedded mark ID by decoding recognized code information, such as recognized barcode information, of the mark 400.

Then, in step S13, the coordinate transformer 104 calculates data indicating image spatial coordinates representing the positions of the base points of the mark 400 from the positions of the base points detected in step S12. The coordinate transformer 104 then transforms the image spatial coordinates into map spatial coordinates. To transform the coordinates, the coordinate transformer 104 performs spatial projection by means of projective transformation by using a transformation matrix stored in the transformation parameter storage 105. Spatial projection using projective transformation is a technology of the related art, and an explanation thereof will be omitted. The coordinate transformer 104 outputs information indicating the transformed map spatial coordinates to the orientation calculator 106.

Then, in step S14, the orientation calculator 106 calculates the orientation of the mark 400 by using the map spatial coordinates. More specifically, the orientation calculator 106 calculates the orientation of the mark 400 with respect to the map spatial coordinates by using the coordinates of the start point 401 and those of the end point 402, which are two base points.

An example of the calculation method for the orientation of the mark 400 will be described below with reference to FIG. 11.

Figure 11:
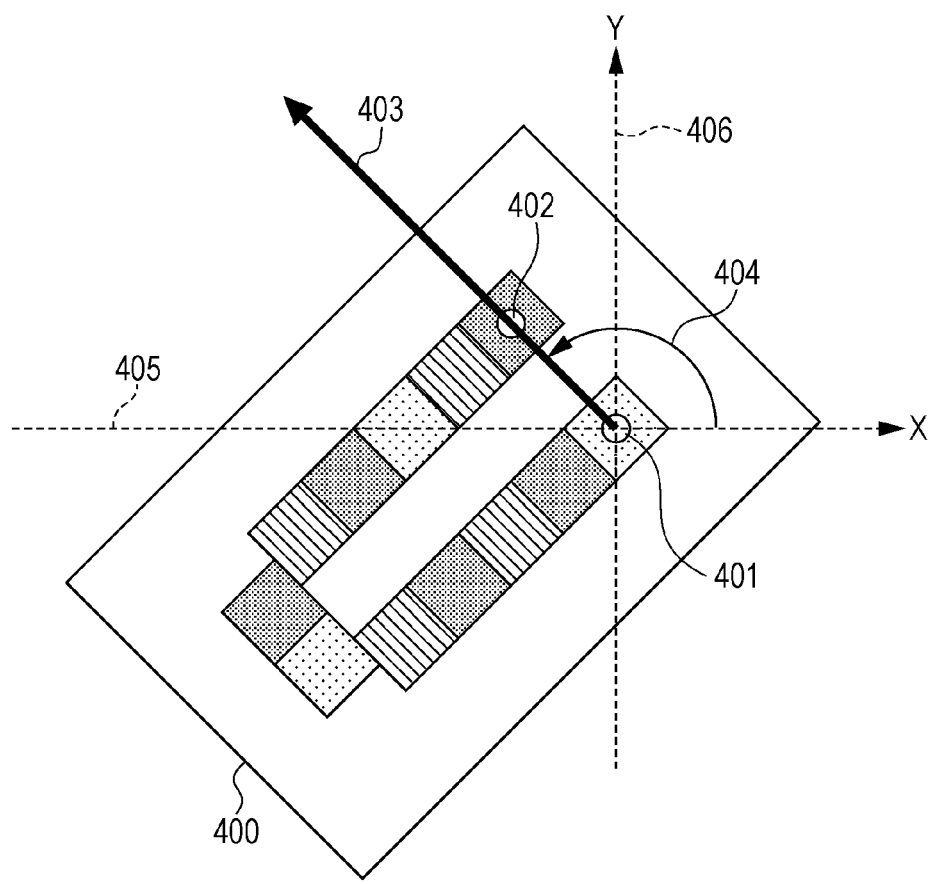
FIG. 11 is a view for explaining an example of a calculation method for the angle of a mark by using map spatial coordinates according to the first embodiment.

FIG. 11 is a view for explaining an example of the calculation method for the angle of the mark 400 by using the map spatial coordinates according to the first embodiment.

As shown in FIG. 11, each of the start point 401 and the end point 402 detected in step S12 has been transformed into map spatial coordinates by the coordinate transformer 104 in step S13. The angle between a vector 403 connecting the start point 401 and the end point 402 and an X axis 405 of the map spatial coordinates by using the start point 401 as an origin is calculated as an angle 404. The angle 404 can be calculated by using trigonometric functions. When the map spatial coordinates of the start point 401 are (X1, Y1) and those of the end point 402 are (X2, Y2), the angle 404 can be calculated by equation (14).

$$\text{Angle } 404 = \tan^{-1} \frac{Y2 - Y1}{X2 - X1} \qquad (14)$$

The angle 404 may be calculated by another method. For example, the angle 404 may be calculated from the vector 403 and a Y axis 406 of the map spatial coordinates. Instead of the angle, a value representing a certain orientation, such as a direction, may be calculated. If the shape of the delivery destination 300, which is a table, to which the mark 400 is attached does not change no matter from which orientation it is viewed, such as when the shape of the table is a perfect circle as viewed from above, step S14 may be omitted.

Then, in step S15, the sender 107 sends mark information including the mark ID detected in step S12 and information concerning the start point 401 and the end point 402 transformed into the map spatial coordinates in step S13 to the mark management server device 500. If the orientation calculator 106 calculates the angle 404 in step S14, the mark information includes information concerning the angle 404, as well as the information concerning the start point 401 and the end point 402. The center position of the delivery destination 300 may be calculated from the information concerning the start point 401 and the end point 402 and be included in the mark information. In the first embodiment, step S14 is optional and may be omitted.

Then, in the mark management server device 500, in step S21, the mark information receiver 501 receives the mark information, and the mark information register 502 stores the received mark information in the mark information storage 503. If mark information including the same mark ID as that included in the received mark information is stored in the mark information storage 503, it is updated to the received mark information. If mark information including the same mark ID as that included in the received mark information is not stored in the mark information storage 503, the received mark information is stored in the mark information storage 503.

In the mark management server device 500, in step S22, the mark information request receiver 504 receives a mark information request from the autonomous mobile device 200 and outputs a request to acquire mark information to the mark information acquirer 505. Upon receiving this request, the mark information acquirer 505 acquires mark information associated with the mark ID of the delivery destination 300 stored in the mark information storage 503. More specifically, the mark information acquirer 505 searches the mark information storage 503 for mark information associated with the mark ID of the delivery destination 300, and acquires the searched mark information from the mark information storage 503. The mark information acquirer 505 then sends the acquired mark information to the autonomous mobile device 200 by using the mark information sender 506.

Then, the imaging device 100 repeatedly performs imaging to generate an image (step S10) and repeatedly sends mark information obtained based on the generated image to the mark management server device 500 (steps S11 through S15), and the mark management server device 500 repeatedly stores and sends the received mark information (steps S21 and S22).

The operation of the autonomous delivery system 10 will be described, assuming that the predetermined delivery area is a café and that the autonomous mobile device 200 delivers an item ordered from a user in the café to the user at a table, which is the delivery destination 300, as a goal point.

FIG. 9 is a flowchart illustrating an example of processing to be executed when an order is placed from a user according to the first embodiment.

In step S1, the user first inputs information by using a terminal device to order a desired item. Then, in step S2, the terminal device sends the input information to a device in the kitchen in the café, for example. The ordered item and the mark ID are displayed on the device. In step S3, the staff in the café prepares the ordered item and loads it in the autonomous mobile device 200. Then, in step S4, the staff gives a delivery instruction. More specifically, in step S4, the staff inputs the table number of the table to specify a delivery destination 300 and presses a button so that the autonomous mobile device 200 will be sent to the delivery destination 300.

Processing for delivering an item by using mark information according to the first embodiment will be described below with reference to FIG. 10.

FIG. 10 is a sequence diagram illustrating an example of the operation of the mark management server device 500 and the autonomous mobile device 200 in the autonomous delivery system 10 according to the first embodiment. The autonomous mobile device 200 delivers an item based on mark information according to the following procedure.

In step S31, when a delivery destination 300 is specified, the autonomous mobile device 200 requests, by using the communication unit 202, the mark management server device 500 to send mark information concerning the mark 400 disposed on the table associated with the delivery destination 300. Then, in step S22, the mark management server device 500 sends a requested piece of mark information stored in the mark information storage 503 to the autonomous mobile device 200 by using the mark information sender 506. The autonomous mobile device 200 then receives the requested piece of mark information from the mark management server device 500 by using the communication unit 202.

In this example, the autonomous mobile device 200 obtains the piece of mark information only concerning the table number of the table, which is the delivery destination 300. However, the autonomous mobile device 200 may obtain all pieces of mark information stored in the mark information storage 503 regardless of the delivery destination 300.

Then, in step S32, the autonomous mobile device 200 generates a path from the current position of the autonomous mobile device 200 to the delivery destination 300 based on the received mark information. More specifically, the path generator 203 of the autonomous mobile device 200 generates a path based on the mark information received from the mark management server device 500 and map information stored in the map information storage 204. For example, the path generator 203 generates a path from the current position to the delivery destination 300 by avoiding static obstacles, such as walls, based on the map information. If the path generator 203 judges based on the map information that the autonomous mobile device 200 is unable to move on a straight path from the moving start position to the delivery destination 300, it generates a path by setting several relay points from the moving start position to the delivery destination 300. A known technique may be used for generating a path, and a detailed explanation thereof will be omitted. The path generator 203 outputs information indicating the generated path to the moving controller 205.

In step S33, the moving controller 205 receives information indicating the generated path, and moves the autonomous mobile device 200 while controlling the moving unit 206 based on this path. In step S34, when the autonomous mobile device 200 reaches the delivery destination 300, it stops moving and completes delivery processing. When the ordered item is removed from the autonomous mobile device 200 or when a predetermined period of time elapses after the autonomous mobile device 200 has reached a stop position, the autonomous mobile device 200 returns to a fixed position, such as a place where items are loaded in the autonomous mobile device 200. The fixed position is the above-described predetermined start position, that is, the moving start position of the autonomous mobile device 200.

After returning to the predetermined start position, the autonomous mobile device 200 waits for a delivery destination 300 to be specified again. When a delivery destination 300 is specified, the communication unit 202 of the autonomous mobile device 200 receives mark information from the mark management server device 500 again. The path generator 203 then generates a path to the delivery destination 300 again based on the mark information received by the communication unit 202 and the map information, and the moving controller 205 controls the moving unit 206 based on the generated path.

In this manner, steps S21, S31, S22, S32, S33, and S34 are repeated.

With the above-described configuration, even if the position of a table, which is a specified delivery destination 300, is changed during a time from when the autonomous mobile device 200 starts to return to the predetermined start position until when the delivery destination 300 is specified, the autonomous mobile device 200 can deliver an ordered item to this table as the delivery destination 300.

The autonomous mobile device 200 may repeatedly execute steps S31 and S32 while moving. Then, even if the position of a table, which is a delivery destination 300, is changed while the autonomous mobile device 200 is moving, the autonomous mobile device 200 can deliver an ordered item to the delivery destination 300. In this case, in step S32, the path generator 203 generates a path from the current position of the autonomous mobile device 200 to the delivery destination 300.

With the configuration of the autonomous delivery system 10, as a result of reading a mark 400 by using the imaging device 100 and moving the autonomous mobile device 200 based on the position of the mark 400 in a map space, an item can be delivered to a delivery destination 300 even if the position of the delivery destination 300 is changed.

[Operational Advantages]

Operational advantages of the autonomous mobile device 200, the autonomous delivery system 10, the delivery method, and the non-transitory recording medium according to the first embodiment will be described below.

As discussed above, the autonomous mobile device 200 according to an aspect of the present disclosure includes a mounting portion on which an item to be delivered is mounted, and delivers this item to a delivery destination 300. The imaging device 100 images a delivery area of the autonomous mobile device 200 to generate an image and sends mark information obtained based on the image to the mark management server device 500. The mark information includes a mark ID, which is ID information indicating a mark 400 attached to a table placed within the delivery area, and position information indicating the position of the mark 400 in a map space.

The mark management server device 500 includes the mark information storage 503 that stores mark information. Every time the mark management server device 500 receives mark information from the imaging device 100, it updates mark information stored in the mark information storage 503 to the received mark information.

The autonomous mobile device 200 includes the communication unit 202 that receives mark information stored in the mark information storage 503 from the mark management server device 500, the map information storage 504 that stores map information concerning a delivery area, the moving unit 206 that moves the autonomous mobile device 200, the path generator 203 that sets a table to which a mark 400 is attached as a delivery destination 300 and generates a path from a moving start position of the autonomous mobile device 200 to the delivery destination 300 based on the mark information and the map information, and the moving controller 205 that controls the moving unit 206 so that the autonomous mobile device 200 will move to the delivery destination 300 based on the generated path.

If, while the autonomous mobile device 200 is moving to the delivery destination 300, the communication unit 202 receives a new piece of mark information indicating the mark 400 attached to the table, which is the delivery destination 300, from the mark management server device 500, the path generator 203 generates a path from the current position of the autonomous mobile device 200 to the delivery destination 300 again, based on the received new piece of mark information and the map information. The moving controller 205 then controls the moving unit 206 based on the generated path.

Every time the imaging device 100 images the delivery area including a table to generate an image, it generates mark information including a mark ID and position information indicating the position in a map space based on the generated image, and sends the generated mark information to the mark management server device 500.

There may be a situation where, during a time from when the autonomous mobile device 200 has delivered an item to a table, which is a delivery destination 300, until when this delivery destination 300 is specified again, the position of the delivery destination 300 is changed. With the above-described configuration, however, the latest mark information is stored in the mark information storage 503 of the mark management server device 500. The autonomous mobile device 200 thus receives the latest mark information from the mark management server device 500 and generates a path based on the latest mark information by using the path generator 203. It is thus possible to reliably deliver an item to the delivery destination 300 which has been displaced.

In this manner, even if the position of the delivery destination 300 is changed, an item can be delivered to the delivery destination 300.

The autonomous delivery system 10 according to an aspect of the present disclosure includes the autonomous mobile device 200, the imaging device 100, and the mark management server device 500.

The imaging device 100 includes the imaging unit 101 that images a delivery area of the autonomous mobile device 200 to generate an image including the mark 400, the mark detector 103 that reads a mark ID associated with ID information concerning a mark 400 attached to a table placed within the delivery area from the generated image so as to detect the position of the mark 400, the coordinate transformer 104 that transforms the position of the mark 400 included in the image to position information indicating the position of the mark 400 in a map space, and the sender 107 that sends mark information including the mark ID and the position information to the mark management server device 500.

The mark management server device 500 includes the mark information storage 503 that stores mark information received from the imaging device 100.

Every time the imaging unit 101 images the delivery area to generate an image, the mark detector 103 reads the mark ID of a mark 400 from the image and detects the position of the mark 400 included in the image. The coordinate transformer 104 then transforms the detected position of the mark 400 to position information indicating the position of the mark 400 in a map space. The sender 107 then sends mark information including the mark ID and the transformed position information to the mark management server device 500.

The mark management server device 500 updates mark information stored in the mark information storage 503 to mark information received from the imaging device 100.

Upon receiving a mark information request from the autonomous mobile device 200, the mark management server device 500 reads the requested mark information stored in the mark information storage 503 and sends it to the autonomous mobile device 200.

The delivery method according to an aspect of the present disclosure is a method using the autonomous mobile device 200 including a mounting portion on which an item to be delivered is mounted. The autonomous mobile device 200 delivers an item to a delivery destination 300. The imaging device 100 images a delivery area of the autonomous mobile device 200 to generate an image and sends mark information corresponding to first mark information generated based on the image. The mark information includes a mark ID, which is ID information concerning a mark 400 corresponding to a first mark attached to a table corresponding to a first object placed within the delivery area, and position information indicating the position of the mark 400 in a map space.

The mark management server device 500 includes the mark information storage 503 that stores mark information. Every time the mark management server device 500 receives mark information from the imaging device 100, it updates mark information stored in the mark information storage 503 to the received mark information.

The autonomous mobile device 200 receives mark information stored in the mark information storage 503 from the mark management server device 500, generates a path from the moving start position of the autonomous mobile device 200 to a delivery destination 300, which is a table including a mark 400, based on the mark information and map information concerning the delivery area stored in the map information storage unit 204, and controls the moving unit 206 so that the autonomous mobile device 200 will move to the delivery destination 300 based on the generated path.

The non-transitory recording medium according to an aspect of the present disclosure stores a program which causes a computer to execute the delivery method.

The autonomous delivery system 10, the delivery method, and the non-transitory recording medium also achieve advantages similar to those obtained by the autonomous mobile device 200.

In an embodiment of the present disclosure, the imaging device 100 also calculates the orientation of a mark 400 corresponding to a first mark, and the sender 107 sends mark information including the mark ID of the mark 400, position information indicating the position of the mark 400 in a map space, and information indicating the orientation of the mark 400 to the mark management server device 500.

With this configuration, mark information received from the mark management server device 500 by the communication unit 202 includes information indicating the orientation of the mark 400, as well as the mark ID and the position information. The autonomous mobile device 200 can thus determine the orientation of a table, such as the longitudinal direction of the table.

This enables the autonomous mobile device 200 to calculate a more appropriate stop position in accordance with the shape of the table. The autonomous mobile device 200 is thus able to stop at a more appropriate stop position and to deliver an item to the delivery destination 300 more appropriately.

Second Embodiment

[Configuration]

The configuration of an autonomous delivery system 10 according to a second embodiment will be described below.

Figure 12:
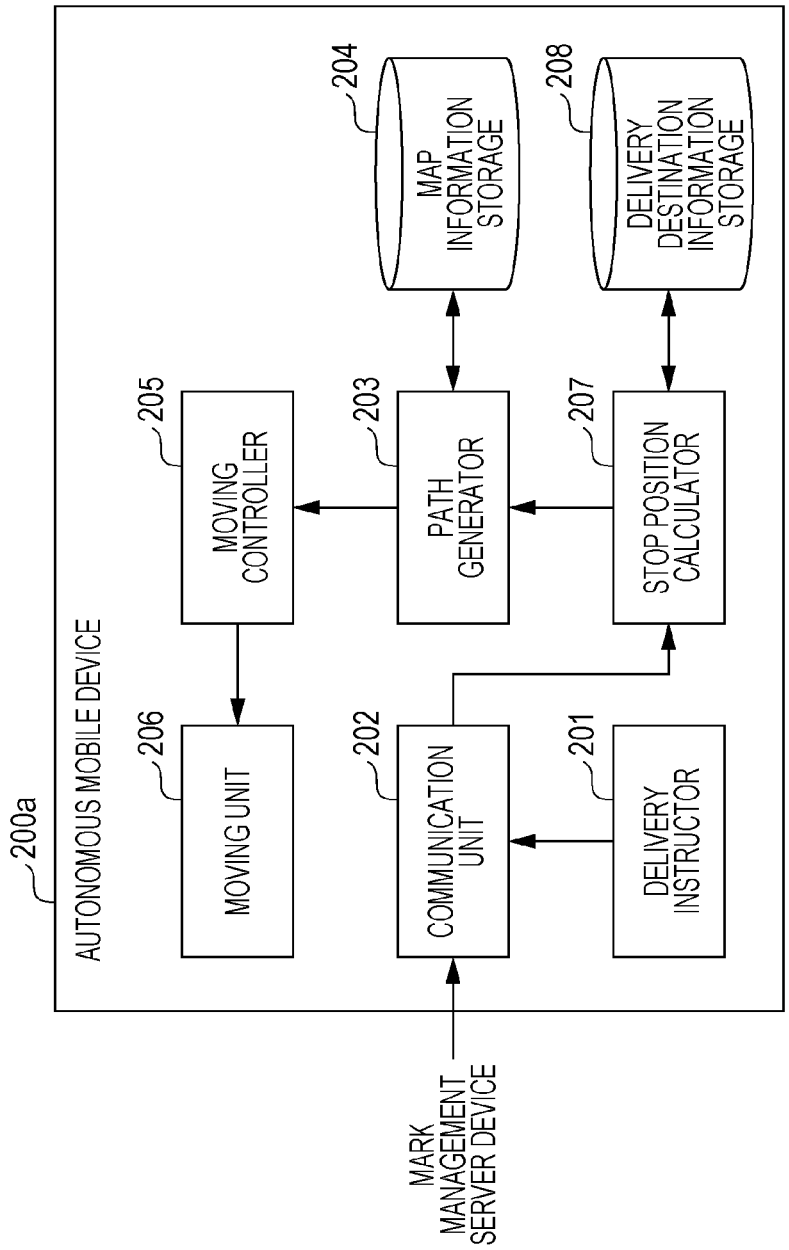
FIG. 12 is a block diagram illustrating an example of an autonomous mobile device according to a second embodiment.

FIG. 12 is a block diagram illustrating an example of an autonomous mobile device 200a according to the second embodiment.

In the second embodiment, an object, which is a delivery destination 300 of the autonomous mobile device 200a, is a table, as in the first embodiment.

The autonomous mobile device 200a of the second embodiment differs from the autonomous mobile device 200 of the first embodiment in that it includes a stop position calculator 207 and a delivery destination information storage 208, in addition to the elements of the autonomous mobile device 200 of the first embodiment. The stop position calculator 207 calculates the shape of the table as the delivery destination 300 and determines a stop position at which the autonomous mobile device 200a will stop in the delivery destination 300 in accordance with the shape of the table. The delivery destination information storage 208 stores delivery destination information.

The configuration of the autonomous delivery system 10 of the second embodiment is similar to that of the first embodiment, except for the above-described configuration of the autonomous mobile device 200a. Elements having the same configurations as those of the first embodiment are designated by like reference numerals, and a detailed explanation thereof will be omitted.

The stop position calculator 207 calculates a stop position based on delivery destination information and mark information. More specifically, the stop position calculator 207 calculates a stop position of the autonomous mobile device 200a, based on mark information received from the mark management server device 500 by the communication unit 202 and delivery destination information stored in the delivery destination information storage 208. If the shape of a table, which is a delivery destination 300, is polygonal as viewed from above, the stop position calculator 207 calculates the positions of the corners of the table based on the delivery destination information and the mark information, and sets one of positions separated from the positions of the corners of the delivery destination 300 by a first distance as a stop position. The positions separated from the positions of the corners of the delivery destination 300 by the first distance are positions which can be around or adjacent to the corners. The stop position calculator 207 outputs information indicating the calculated stop position to the path generator 203. The stop position calculator 207 is constituted by a CPU or an MPU, for example. The mark information includes the mark ID of the mark 400, position information indicating the position of the mark 400 in a map space, and information indicating the orientation of the mark 400.

The delivery destination information storage 208 stores delivery destination information including the mark ID corresponding to a delivery destination 300 and the shape and the size of the delivery destination 300. More specifically, the delivery destination information includes the mark ID of a mark corresponding to the delivery destination 300, information indicating the shape of a table corresponding to an object, and information indicating the size of this table.

The delivery destination information will be discussed below with reference to FIG. 13.

FIG. 13 illustrates an example of delivery destination information stored in the delivery destination information storage 208 according to the second embodiment.

As shown in FIG. 13, in the delivery destination information storage 208, delivery destination information indicating the mark ID corresponding to a mark 400 attached to a table, which is a delivery destination 300, and the shape and the size of the table is stored. When the shape of the table is a perfect circle, the size of the table is represented by the radius as the delivery destination information. As the delivery destination information, an ID indicating the shape of a table or a silhouette image indicating the shape pattern of a table may be stored in the delivery destination information storage 208. The size of a table may be represented by position vectors of the vertices of the table or the angle and the length of a line perpendicular to each side of the table. The delivery destination information storage 208 is constituted by a semiconductor memory or a hard disk drive, for example.

Calculating of a stop position will be discussed below with reference to FIG. 14.

Figure 14:
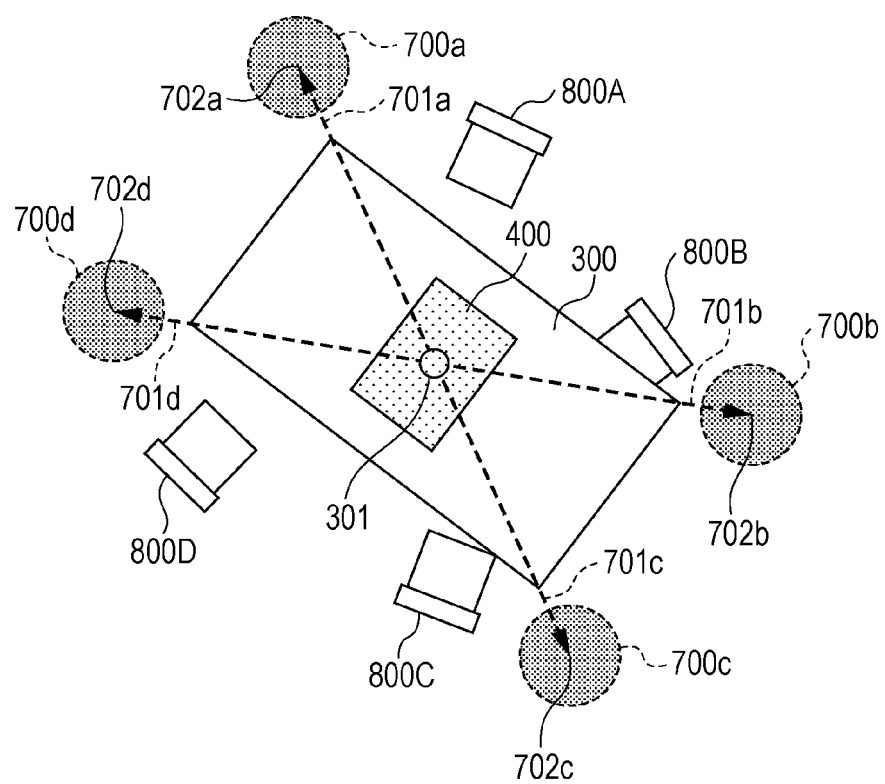
FIG. 14 is a schematic view illustrating an example of a stop position when a delivery destination is a rectangular table according to the second embodiment.

FIG. 14 is a schematic view illustrating an example of a stop position when the shape of a table, which is a delivery destination 300, is a rectangle according to the second embodiment.

The shape of the table is not restricted to a rectangle, but may be another polygon. In this example, the delivery destination 300 has four corners at positions 701a, 701b, 701c, and 701d. Positions separated from the positions 701a, 701b, 701c, and 701d by a first distance are respectively set as stop position candidates 702a, 702b, 702c, and 702d. The stop position candidates 702a, 702b, 702c, and 702d are positions that can be adjacent to the corners of the table.

Regions 700a, 700b, 700c, and 700d are circular regions respectively including the stop position candidates 702a, 702b, 702c, and 702d at the center, and the radii of the circular regions 700a, 700b, 700c, and 700d are smaller than the first distance, for example. The circular regions 700a, 700b, 700c, and 700d are adjacent to the corners of the table. The stop position candidates 702a, 702b, 702c, and 702d are also called stoppable positions.

Lines are drawn from a center position 301 of the table toward the positions 701a, 701b, 701c, and 701d of the table. The stoppable positions 702a, 702b, 702c, and 702d are respectively located on extensions of these lines separated from the positions 701a, 701b, 701c, and 701d by the first distance.

The path generator 203 selects one of the stoppable positions 702a, 702b, 702c, and 702d and calculates a path by using the selected stoppable position as a stop position.

When the autonomous mobile device 200a reaches the circular region including this stop position, the moving controller 205 controls the moving unit 206 so that the autonomous mobile device 200a will stop. The circular regions 700a, 700b, 700c, and 700d are also called stoppable regions.

Around the table, which is a delivery destination 300, chairs, which are an example of obstacles 800A, 800B, 800C, and 800D, are placed. The obstacles 800A, 800B, 800C, and 800D are dynamic obstacles. Other examples of the dynamic obstacles are people and bags.

The path generator 203 generates a path to the stop position as a path to the delivery destination 300. The path generator 203 generates a path which does not collide with the obstacles 800A, 800B, 800C, and 800D, and outputs information concerning the generated path to the moving controller 205.

The autonomous mobile device 200a can estimate that, when the delivery destination 300 is a rectangular table, chairs, which are the obstacles 800A, 800B, 800C, and 800D, are less likely to be placed at the positions 701a, 701b, 701c, and 701d at the corners of the table, and that regions near the positions 701a, 701b, 701c, and 701d are less likely to be influenced by obstacles. The autonomous mobile device 200a can thus assume that it can stop at one of the stoppable positions 702a, 702b, 702c, and 702d.

A case in which the shape of a delivery destination 300 is not polygonal but is formed without corners, such as an ellipse, as viewed from above will be discussed below with reference to FIG. 15. In this case, a region 900 from an outer edge 302 of the delivery destination 300 to the elliptical dashed line in FIG. 15 is calculated, and a position within the region 900 is selected as a stop position.

Figure 15:
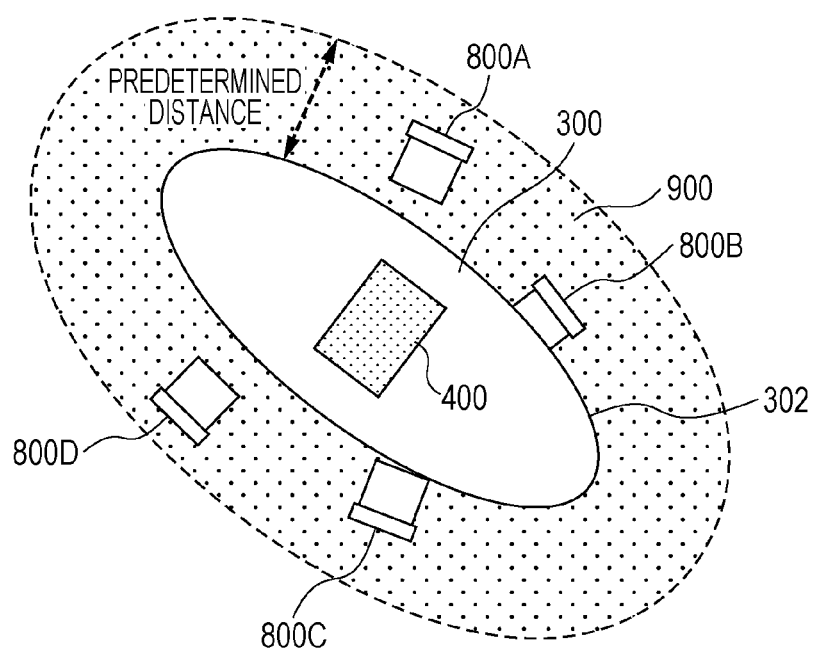
FIG. 15 is a schematic view illustrating an example of a stop position when a delivery destination is an elliptical table according to the second embodiment.

FIG. 15 is a schematic view illustrating an example of a stop position when the shape of a table, which is a delivery destination 300, is an ellipse according to the second embodiment. Elements similar to those in FIGS. 1 and 14 are designated by like reference numerals, and an explanation thereof will be omitted.

FIG. 15 illustrates a table, which is a delivery destination 300, formed in an elliptical shape as viewed from above. The outer edge 302 is an outer edge of the table. The region 900 is a region defined by a second distance (indicated by a predetermined distance in FIG. 15) from the outer edge 302 toward the farther outer side. In this case, a position within the region 900 and without the obstacles 800A, 800B, 800C, and 800D is selected as a stop position. When the delivery destination 300 is an elliptical table, chairs, which are the obstacles 800A, 800B, 800C, and 800D, are likely to be placed near the outer edge 302 of the table. Consequently, a position within the region 900 and without the obstacles 800A, 800B, 800C, and 800D is set as a stop position. The stop position is determined based on the size of the chairs, and the second distance from the outer edge 302 to the outer periphery of the region 900 is greater than the size of the chairs.

The above-described stop positions are only examples. For example, even when the shape of a table, which is a delivery destination 300, is polygonal, a region defined by the second distance from the outer edge 302 may be set as the region 900, and a position within the region 900 may be determined as a stop position, as in the above-described example.

[Operation]

Processing for generating a path to a delivery destination 300 by the autonomous mobile device 200a will be described below with reference to FIG. 16. Path generating processing is executed in step S32 of FIG. 10. The more specific operation of path generating processing will be discussed with reference to FIG. 16.

Figure 16:
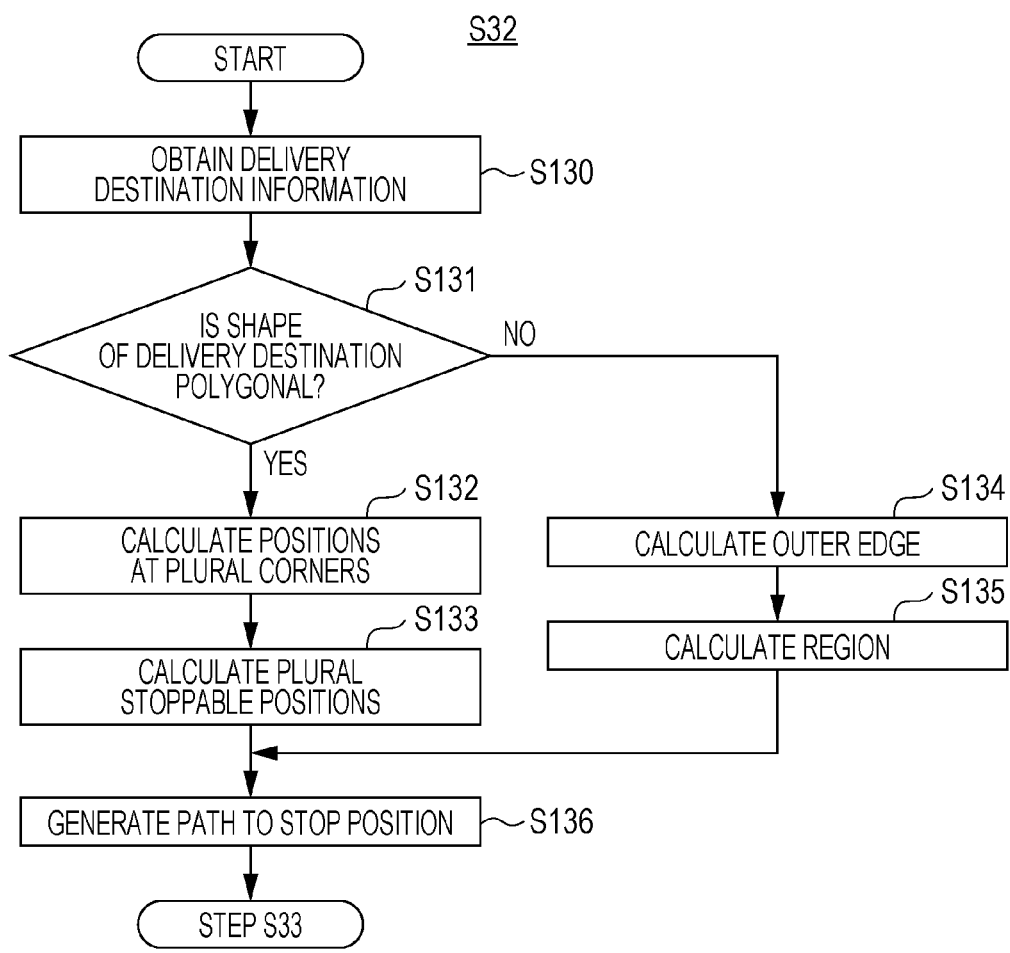
FIG. 16 is a flowchart illustrating an example of path generating processing executed by the autonomous mobile device according to the second embodiment.

FIG. 16 is a flowchart illustrating an example of path generating processing executed by the autonomous mobile device 200a according to the second embodiment.

In step S130, by using the mark ID indicated by mark information received from the mark management server device 500 by the communication unit 202, the stop position calculator 207 obtains delivery destination information indicating the shape and the size of a table, which is the delivery destination 300 corresponding to this mark ID, from the delivery destination information storage 208.

Then, the stop position calculator 207 determines in step S131 whether the shape of the delivery destination 300 indicated by the delivery destination information is a polygon, such as a triangle or a quadrilateral. In the second embodiment, the process may branch off to two different operations depending on whether the shape of the table is polygonal. The stop position calculator 207 calculates a stop position in accordance with this judgement result. If the same operation is executed regardless of the shape of a delivery destination 300, step S131 (conditional branch) may be omitted.

If the process branches off to three or more different operations depending on the shape of a delivery destination 300, one or more conditional branches for determining the shape of the delivery destination 300 may be added after step S131, and different calculation processing may be executed for calculating a stop position instead of steps S132 through S136.

If the shape of the table is polygonal (YES in step S131), the stop position calculator 207 calculates the positions 701a, 701b, 701c, and 701d at the corners of the table in step S132. The stop position calculator 207 calculates the positions 701a, 701b, 701c, and 701d in the following manner. The stop position calculator 207 first calculates the center position 301 of the delivery destination 300 from the positions of base points indicated by the mark information. The stop position calculator 207 then determines the orientation of the delivery destination 300 by referring to the orientation of the mark indicated by the mark information and calculates the positions 701a, 701b, 701c, and 701d from the size of the delivery destination 300 indicated by the delivery destination information. This is only an example, and the positions 701a, 701b, 701c, and 701d may be calculated in another manner.

Then, in step S133, the stop position calculator 207 calculates the stoppable positions 702a, 702b, 702c, and 702d by using information indicating the positions 701a, 701b, 701c, and 701d calculated in step S132. The stoppable positions 702a, 702b, 702c, and 702d, which are stop position candidates, are the center positions of the circular regions 700a, 700b, 700c, and 700d, respectively. The stop position calculator 207 outputs information indicating the calculated stoppable positions 702a, 702b, 702c, and 702d to the path generator 203.

In this example, as shown in FIG. 14, the stoppable positions 702a, 702b, 702c, and 702d are respectively located on extensions of lines connecting the center position 301 of the table and the positions 701a, 701b, 701c, and 701d, and are respectively separated from the positions 701a, 701b, 701c, and 701d by the first distance. The stoppable positions 702a, 702b, 702c, and 702d are located so as to respectively sandwich the positions 701a, 701b, 701c, and 701d with the center position 301 and are located on the side opposite the center position 301 with respect to the positions 701a, 701b, 701c, and 701d. The stoppable positions 702a, 702b, 702c, and 702d are positions at which the autonomous mobile device 200a can stop.

The length about twice as large as that of the autonomous mobile device 200a in the moving direction may be set as the diameter of the circular regions 700a, 700b, 700c, and 700d. The above-described calculation processing for the stop position is only an example.

Referring back to FIG. 16, if the shape of the table is not polygonal (NO in step S131), the stop position calculator 207 calculates the position of the outer edge 302 of the delivery destination 300 in step S134. To calculate the position of the outer edge 302, the stop position calculator 207 calculates the center position of the delivery destination 300 from the positions of the base points based on the mark information and the delivery destination information.

Then, in step S135, the stop position calculator 207 calculates the region 900 by using the outer edge 302 of the table calculated in step S134. The region 900 is a region between the outer edge 302 and the position indicated by the elliptical dashed line in FIG. 15, which is separated from the outer edge 302 toward the farther outer side by the second distance. The predetermined distance indicated in FIG. 15 is a length about twice or three times as large as the front-back length of the obstacles 800A, 800B, 800C, and 800D. The stop position calculator 207 outputs information indicating the region 900 to the path generator 203.

The peripheral shape of the region 900 is geometrically similar to that of the table, which is the delivery destination 300. Consequently, a silhouette image, which serves as the region 900, corresponding to the shape of the table may be prepared. The silhouette image may then be rotated in the orientation indicated by the mark information and be superposed on the center position of the table. The region determined in this manner may then be set as the region 900. The above-described calculation processing for the region 900 is only an example.

The path generator 203 receives information indicating the stoppable positions 702a, 702b, 702c, and 702d or information indicating the region 900 from the stop position calculator 207. If the path generator 203 receives information indicating the stoppable positions 702a, 702b, 702c, and 702d from the stop position calculator 207, it selects one of the stoppable positions 702a, 702b, 702c, and 702d as a stop position and generates a path from the moving start position or the current position of the autonomous mobile device 200a to the stop position in step S136. The process then returns to step S33.

In the above-described example, if the shape of the table is polygonal, the path generator 203 selects one of plural stoppable positions. Alternatively, in step S133, the stop position calculator 207 may select one of the plural stoppable positions.

In this case, in step S136, the path generator 203 generates a path by using the stop position received from the stop position calculator 207.

If the path generator 203 receives information indicating the region 900 from the stop position calculator 207, the path generator 203 calculates a position within the region 900 and without obstacles as a stop position and generates a path from the moving start position or the current position of the autonomous mobile device 200a to the stop position in step S136.

In the above-described example, if the shape of the table is not polygonal, the path generator 203 calculates a position within the region 900 as a stop position. Alternatively, the stop position calculator 207 may calculate a position within the region 900 as the stop position. In this case, the path generator 203 generates a path by using the stop position received from the stop position calculator 207.

The path generator 203 then outputs information indicating the generated path to the moving controller 205. The process then returns to step S33 of FIG. 10.

[Operational Advantages]

Operational advantages of the autonomous mobile device 200a according to the second embodiment will be described below.

As discussed above, the autonomous mobile device 200a according to an aspect of the present disclosure includes the delivery destination information storage 208 and the stop position calculator 207, in addition to the elements of the autonomous mobile device 200 of the first embodiment. The delivery destination information storage 208 stores delivery destination information indicating a mark ID corresponding to a mark 400 attached to a table, which is a delivery destination 300, and the shape and the size of the table. The stop position calculator 207 calculates a stop position at which the autonomous mobile device 200a will stop in the delivery destination 300, based on the delivery destination information and mark information. The path generator 203 generates a path from the moving start position or the current position of the autonomous mobile device 200a to the calculated stop position as a path to the delivery destination 300.

This configuration enables the autonomous mobile device 200a to deliver an item to the stop position. It is thus possible to calculate a more appropriate stop position at which the autonomous mobile device 200a will stop in a delivery destination 300, based on the shape and the size of a table, which is the delivery destination 300. The autonomous mobile device 200a is thus able to stop at a more appropriate stop position and to deliver an item to the delivery destination 300 more appropriately.

In the autonomous mobile device 200a according to an aspect of the present disclosure, the stop position calculator 207 calculates the position of the outer edge 302 of a table, which is a delivery destination 300, based on the delivery destination information and mark information. The stop position calculator 207 then calculates a region defined by a second distance (predetermined distance) from the outer edge 302, and calculates a position within this region as a stop position.

If the delivery destination is a circular table as viewed from above, obstacles such as chairs may be placed at any position around the circular table. From this point of view, the stop position calculator 207 calculates the position of the outer edge 302 of the delivery destination 300 based on the delivery destination information and mark information, and sets a position included in the region 900 defined by a second distance (predetermined distance) from the outer edge 302 as a stop position. In this case, the stop position is set at a position within the region 900 and without obstacles. It is thus possible to calculate a more appropriate stop position at which the autonomous mobile device 200a will stop in a delivery destination 300, based on the shape and the size of a table. The autonomous mobile device 200a is thus able to stop at a more appropriate stop position and to deliver an item to the delivery destination 300 more appropriately in accordance with the shape of the delivery destination 300.

According to an aspect of the present disclosure, the imaging device 100 also includes the orientation calculator 106 that calculates the orientation of a mark 400 and the sender 107 that sends mark information including the mark ID of the mark 400, position information indicating the position of the mark 400 in a map space, and information indicating the orientation of the mark 400 to the mark management server device 500.

If the shape of a table, which is a delivery destination 300, is polygonal, the stop position calculator 207 of the autonomous mobile device 200a calculates the positions of the corners of the table based on the delivery destination information and mark information, and calculates one of positions separated from the positions of the corners by a first distance as a stop position.

In this manner, if the shape of a table, which is a delivery destination 300, is polygonal, as viewed from above, the stop position calculator 207 calculates the positions of the corners of the table based on the delivery destination information and mark information, and calculates one of the positions separated from the positions of the corners by the first distance as a stop position. The mark information includes information indicating the orientation of the mark 400. Normally, if the shape of a table is polygonal, it is less likely that obstacles, such as chairs, will be placed around the corners of the table. It is thus possible to calculate a more appropriate stop position at which the autonomous mobile device 200a will stop in a delivery destination 300, based on the shape of a table, which is the delivery destination 300. The autonomous mobile device 200a is thus able to stop at a more appropriate stop position and to deliver an item to the delivery destination 300 more appropriately.

In particular, if the delivery destination 300 is a polygonal table, one of positions around the corners of the table where obstacles are less likely to be placed is calculated as a stop position. It is thus possible to deliver an item more reliably while reducing the influence of obstacles. If the shapes of delivery destinations 300 are different from each other, appropriate stop positions are calculated by avoiding obstacles in accordance with the shapes of the individual delivery destinations 300. The autonomous mobile device 200a is thus able to stop at a more appropriate stop position and to deliver an item to the delivery destination 300 more appropriately.

The second embodiment also achieves advantages similar to those obtained by the first embodiment.

Modified Example of Second Embodiment

The configuration of a modified example of the second embodiment is similar to that of the second embodiment. However, the modified example differs from the second embodiment in that, among plural stoppable positions calculated from plural corners of a delivery destination 300, the stop position calculator 207 selects the closest stoppable position to the moving start position or the current position of the autonomous mobile device 200a as a stop position.

The configuration of the autonomous delivery system 10 of this modified example is similar to those of the first and second embodiments, except for the above-described configuration of the autonomous mobile device 200a. Elements having the same configurations as those of the first and second embodiments are designated by like reference numerals, and a detailed explanation thereof will be omitted.

[Operation]

The operation executed by the autonomous mobile device 200a which is delivering an item will be described below with reference to FIG. 17. A detailed explanation of the same step numbers as those in FIG. 16 will be omitted.

Figure 17:
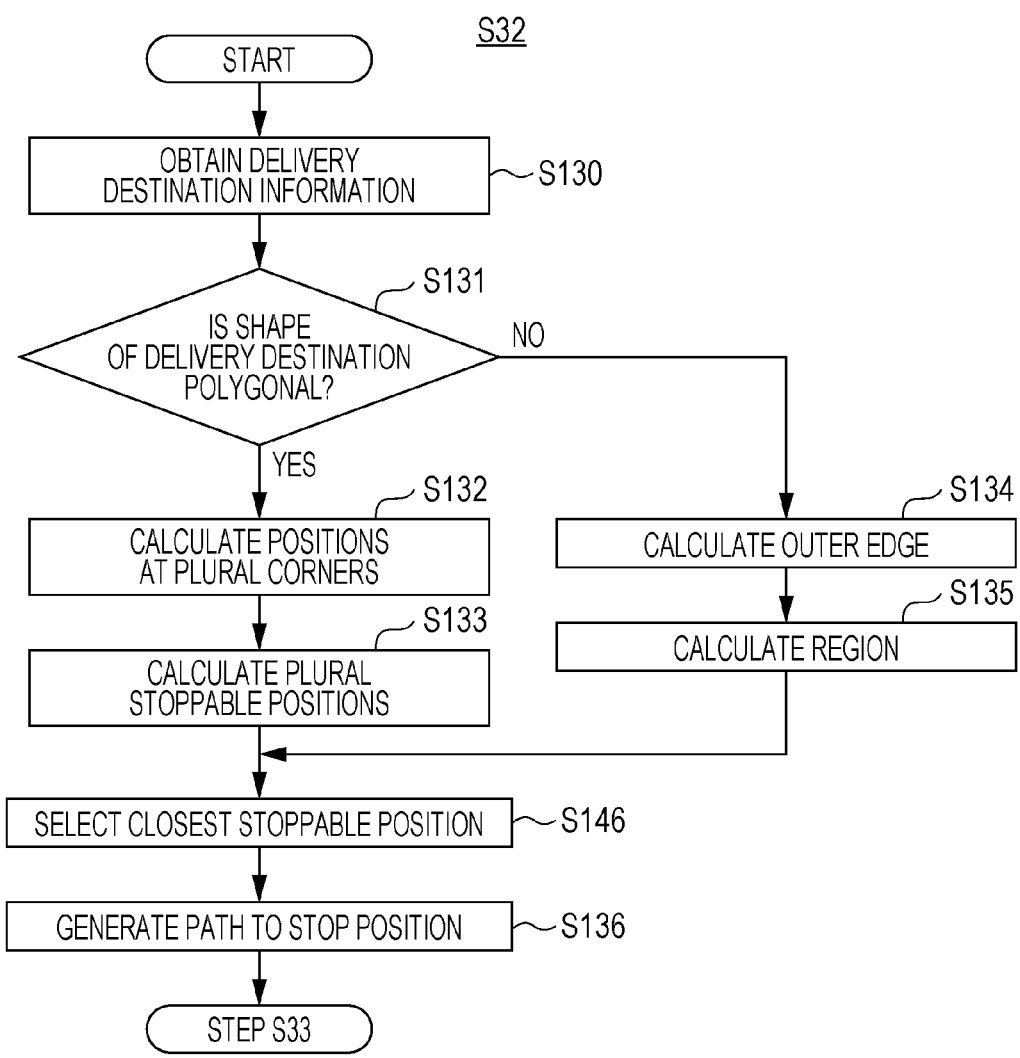
FIG. 17 is a flowchart illustrating an example of path generating processing executed by the autonomous mobile device according to a modified example of the second embodiment.

FIG. 17 is a flowchart illustrating an example of path generating processing executed by the autonomous mobile device 200a according to the modified example of the second embodiment. The flowchart of FIG. 17 is different from that of FIG. 16 in that step S146 is added. It is assumed that, among the stoppable positions 702a, 702b, 702c, and 702d, the stoppable position 702a is the closest position to the moving start position of the autonomous mobile device 200a.

In step S130, the stop position calculator 207 obtains delivery destination information from the delivery destination information storage 208. The stop position calculator 207 then determines in step S131 whether the shape of a table, which is a delivery destination 300, is polygonal.

If the shape of the table is polygonal (YES in step S131), the stop position calculator 207 calculates the positions 701a, 701b, 701c, and 701d at the corners of the table in step S132. In step S133, the stop position calculator 207 respectively calculates the stoppable positions 702a, 702b, 702c, and 702d from the positions 701a, 701b, 701c, and 701d. The stoppable positions 702a, 702b, 702c, and 702d are respectively the center positions of the circular regions 700a, 700b, 700c, and 700d. The stop position calculator 207 then outputs information indicating the stoppable positions 702a, 702b, 702c, and 702d to the path generator 203.

In step S146, the path generator 203 obtains the information indicating the stoppable positions 702a, 702b, 702c, and 702d from the stop position calculator 207. The path generator 203 then selects the closest stoppable position to the moving start position of the autonomous mobile device 200a from among the stoppable positions 702a, 702b, 702c, and 702d. In this modified example, the stoppable position 702a is the closest to the moving start position of the autonomous mobile device 200a. In step S136, the path generator 203 thus generates a path from the moving start position to the stoppable position 702a. The path generator 203 then outputs information indicating the generated path to the moving controller 205. The process then returns to step S33 of FIG. 10.

If the shape of the table is not polygonal (NO in step S131), the stop position calculator 207 calculates the position of the outer edge 302 of the delivery destination 300 in step S134. Then, in step S135, the stop position calculator 207 calculates the region 900 by using the outer edge 302 calculated in step S134. The stop position calculator 207 outputs information indicating the region 900 to the path generator 203.

In step S146, the path generator 203 receives the information indicating the region 900 from the stop position calculator 207. The path generator 203 selects the closest position within the region 900 and without obstacles to the moving start position of the autonomous mobile device 200a as a stop position.

In step S136, the path generator 203 generates a path from the moving start position to the selected stop position. The path generator 203 then outputs information indicating the generated path to the moving controller 205. The process then returns to step S33 of FIG. 10.

[Operational Advantages]

Operational advantages of the autonomous mobile device 200a according to the modified example of the second embodiment will be described below.

As discussed above, in the autonomous mobile device 200a according to an aspect of the present disclosure, the stop position calculator 207 calculates positions of plural corners of a table, which is a delivery destination 300, calculates positions separated from the positions of the plural corners by the first distance as stoppable positions, and selects the closest stoppable position to the moving start position of the autonomous mobile device 200a as a stop position.

This configuration enables the autonomous mobile device 200a to deliver an item to a delivery destination 300 by using a shorter distance, thereby enhancing the operation efficiency of the autonomous delivery system 10.

The modified example of the second embodiment also achieves advantages similar to those obtained by the first and second embodiments.

Third Embodiment

[Configuration]

The configuration of the autonomous delivery system 10 according to a third embodiment will be described below.

Figure 18:
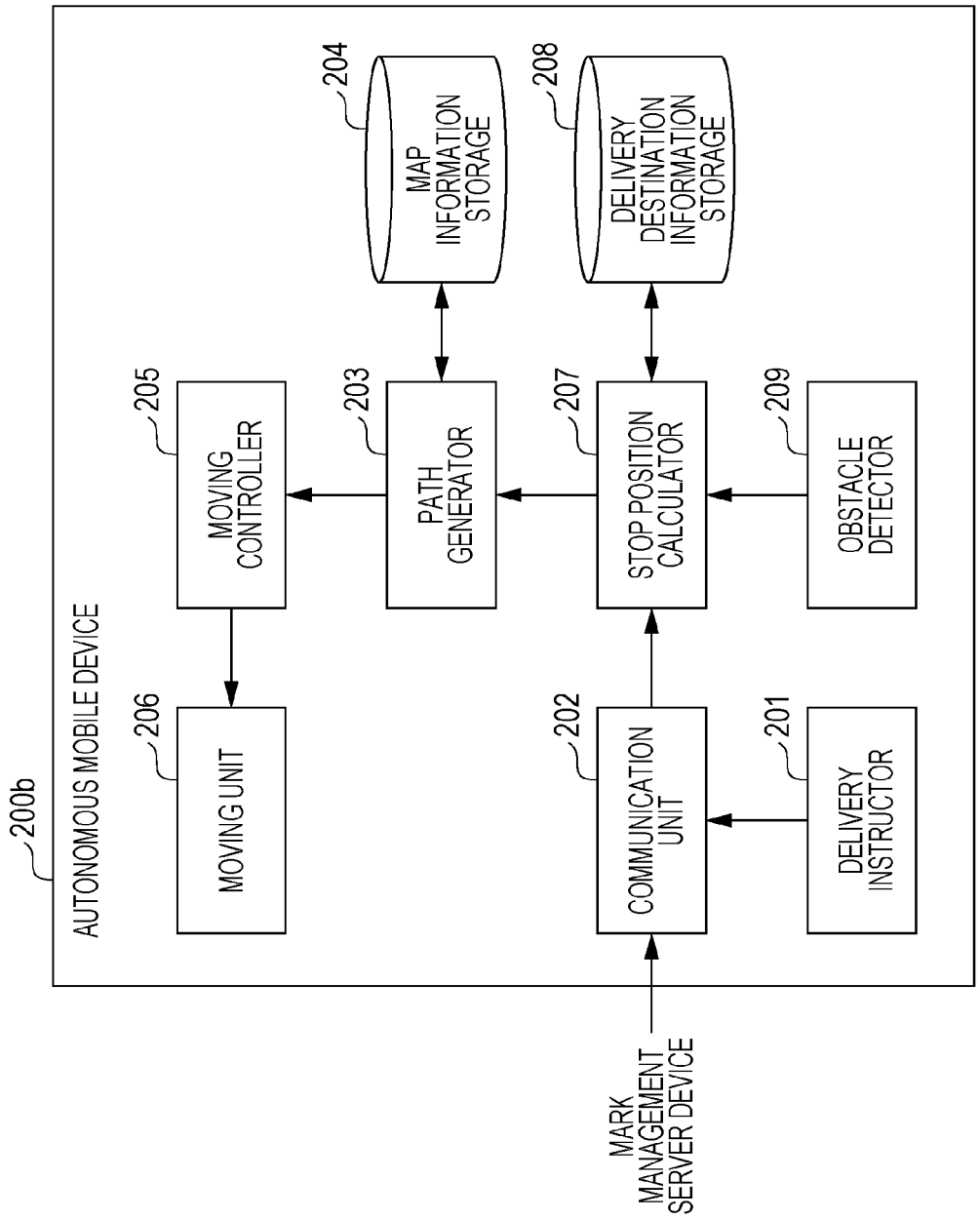
FIG. 18 is a block diagram illustrating an example of an autonomous mobile device according to a third embodiment.

FIG. 18 is a block diagram illustrating an example of an autonomous mobile device 200b according to the third embodiment.

In the third embodiment, the autonomous mobile device 200b includes an obstacle detector 209 that detects an obstacle at and near a stop position, in addition to the elements of the autonomous mobile device 200a of the second embodiment. If the obstacle detector 209 detects an obstacle in a region including a stop position, the stop position calculator 207 calculates an outer edge 302 of a table, which is a delivery destination 300, calculates a region 900 defined by a second distance from the outer edge 302, and recalculates a position within the region 900 at which the autonomous mobile device 200b can stop.

The configuration of the autonomous delivery system 10 of the third embodiment is similar to those of the first and second embodiments, except for the above-described configuration of the autonomous mobile device 200b. Elements having the same configurations as those of the first and second embodiments are designated by like reference numerals, and a detailed explanation thereof will be omitted.

As shown in FIG. 18, the autonomous mobile device 200b includes the obstacle detector 209 in addition to the elements of the autonomous mobile device 200a of the second embodiment shown in FIG. 12.

The obstacle detector 209 is constituted by laser lidar, for example. The laser lidar scans a predetermined delivery area and obtains information concerning obstacles around the laser lidar. The obstacle detector 209 detects obstacles at and near a stop position, for example. The obstacle detector 209 applies laser beams to a predetermined range of angles in the moving direction, right-left direction, and front-back direction at regular intervals, for example, and calculates the distance and the direction to and of a detected obstacle. When the obstacle detector 209 detects any obstacle, it outputs the position of a detected obstacle to the stop position calculator 207.

The obstacle detector 209 is not restricted to laser lidar, and may be an image sensor that can detect obstacles.

The region 900 defined by a predetermined distance from the outer edge 302 of a rectangular table, which is a delivery destination 300, to the rectangular dashed line indicated in FIG. 19 will be discussed below with reference to FIG. 19.

Figure 19:
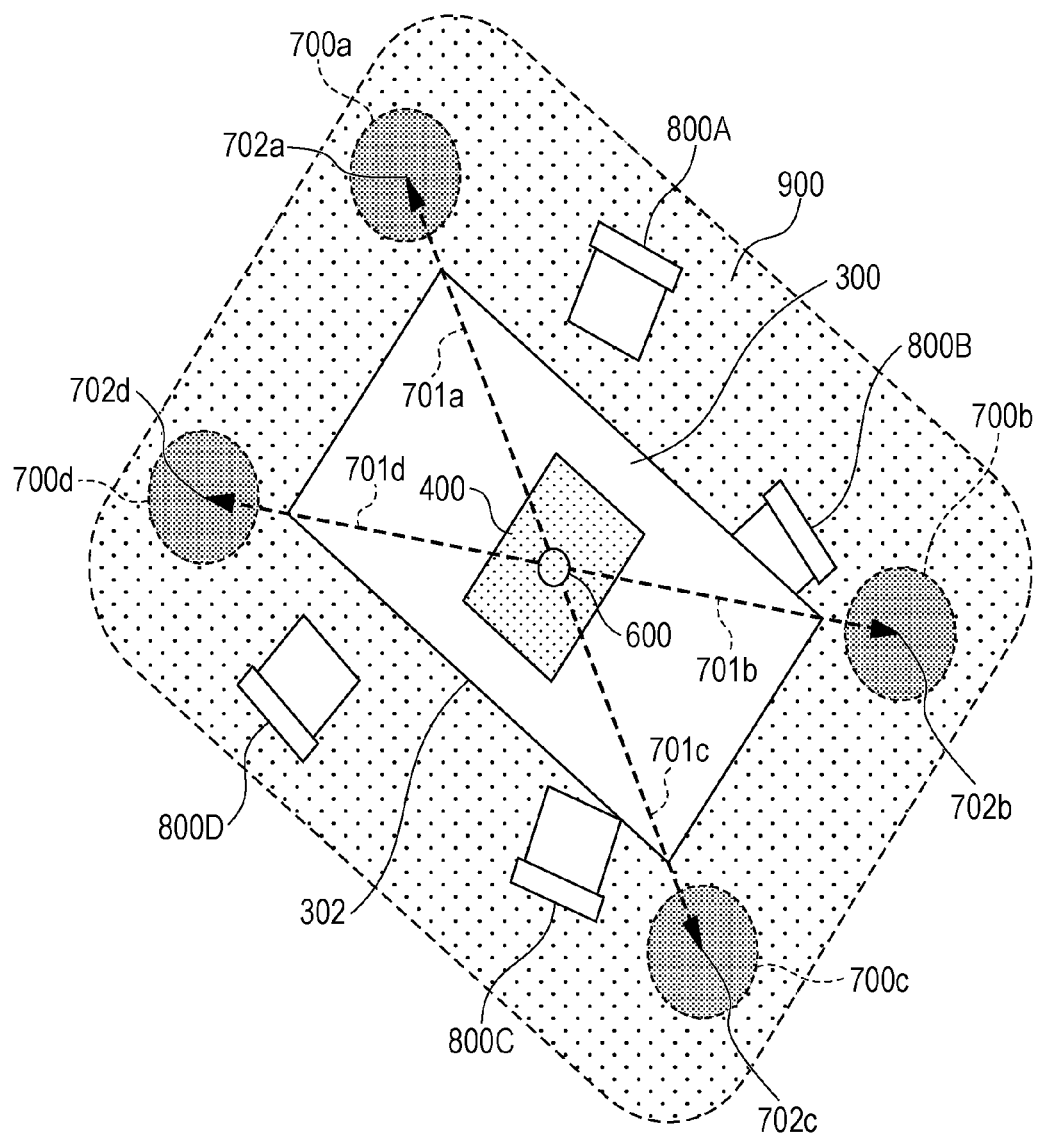
FIG. 19 is a schematic view illustrating an example of a stop position when a delivery destination is a rectangular table according to the third embodiment.

FIG. 19 is a schematic view illustrating an example of a stop position when a delivery destination 300 is a rectangular table according to the third embodiment.

As shown in FIG. 19, in the third embodiment, as well as in the second embodiment, the autonomous mobile device 200b sets one of the stoppable positions 702a, 702b, 702c, and 702d as a stop position so as to deliver an item to a delivery destination 300.

However, the autonomous mobile device 200b may be unable to stop at a stop position because of the presence of an obstacle, such as a chair. In this case, the obstacle detector 209 detects an obstacle, and the stop position calculator 207 calculates, as a new stop position, a position within the region 900 at which the autonomous mobile device 200b can stop. The path generator 203 generates a path from the current position of the autonomous mobile device 200b to the new stop position as a path to the delivery destination 300.

Calculating of stoppable positions from the positions of the corners of a table and calculating of the region 900 from the outer edge 302 of the table are similar to those in the second embodiment, and an explanation thereof will be omitted.

[Operation]

The operation of the autonomous mobile device 200b in the vicinity of a stop position according to the third embodiment will be described below with reference to FIG. 20. The autonomous mobile device 200b executes path generating processing similar to that of the second embodiment, and processing executed by the autonomous mobile device 200b which is moving to a delivery destination 300 after performing path generating processing will be discussed in the third embodiment. The operation of the autonomous mobile device 200b in the vicinity of a stop position is executed in step S33 of FIG. 10. The more specific operation of the autonomous mobile device 200b in the vicinity of a stop position will be described below with reference to FIG. 20.

Figure 20:
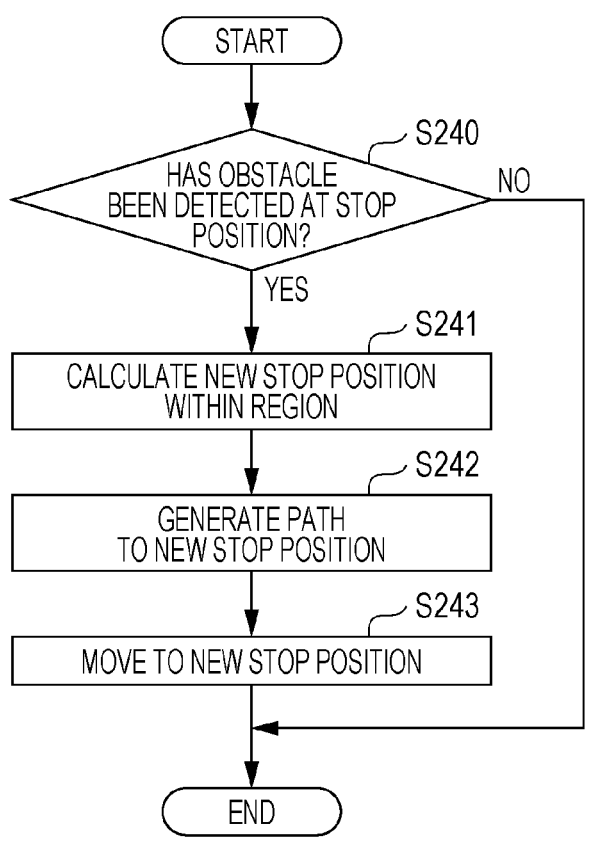
FIG. 20 is a flowchart illustrating an example of the operation of the autonomous mobile device which is moving to a delivery destination according to the third embodiment.

FIG. 20 is a flowchart illustrating an example of the operation of the autonomous mobile device 200b which is moving to a delivery destination 300 according to the third embodiment. In FIG. 20, the stoppable position 702a has been set as a stop position. A path from the moving start position of the autonomous mobile device 200b to the stop position 702a has been generated as a path to the delivery destination 300, and the autonomous mobile device 200b has started to move toward the delivery destination 300 based on the generated path.

In step S240, when the autonomous mobile device 200b is approaching the vicinity of the stop position 702a, the obstacle detector 209 starts to detect the presence of an obstacle. The vicinity of the stop position 702a is a region where an obstacle at the stop position 702a is detectable by the obstacle detector 209. If the obstacle detector 209 has detected an obstacle (YES in step S240), the autonomous mobile device 200b is unable to stop at the stop position 702a. The obstacle detector 209 thus informs the stop position calculator 207 of the presence of an obstacle. As a result of executing processing similar to steps S134 and S135 of FIG. 16 in the second embodiment, for example, the stop position calculator 207 calculates the region 900 from the outer edge 302 to the rectangular dashed line in FIG. 19 and calculates a position within the region 900 at which the autonomous mobile device 200b can stop as a new stop position in step S241. That is, if the obstacle detector 209 detects an obstacle within a circular region such as the circular region 700a, the stop position calculator 207 recalculates the stop position.

Then, in step S242, the path generator 203 generates a path from the current position of the autonomous mobile device 200b to the new stop position. The path generator 203 then outputs information indicating the generated path to the moving controller 205.

In step S243, the moving controller 205 receives the information indicating the generated path, and controls the moving unit 206 so that the autonomous mobile device 200b will move to the new stop position based on this path. The autonomous mobile device 200b moves to the new stop position and delivers an item to the delivery destination 300.

If the obstacle detector 204 has not detected an obstacle (NO in step S240), the autonomous mobile device 200b reaches the stop position 702a and delivers an item to the delivery destination 300.

When the ordered item is removed from the autonomous mobile device 200b or when a predetermined period of time elapses after the autonomous mobile device 200b has reached the stop position, the autonomous mobile device 200b returns to a fixed position, such as a place where items are loaded in the autonomous mobile device 200b, and completes the processing.

[Operational Advantages]

Operational advantages of the autonomous mobile device 200b according to the third embodiment will be described below.

As discussed above, the autonomous mobile device 200b according to an aspect of the present disclosure includes the obstacle detector 209, in addition to the elements of the autonomous mobile device 200a of the second embodiment. If the obstacle detector 209 detects an obstacle at or near a stop position, the stop position calculator 207 calculates a new stop position, and the path generator 203 generates a path to the new stop position as a path to a delivery destination 300.

In this manner, if the autonomous mobile device 200b is unable to stop at or near a stop position because of the presence of an obstacle to deliver an item to a delivery destination 300, the stop position calculator 207 calculates the region 900 defined by a predetermined distance from the outer edge 302 of the delivery destination 300, and sets a position within the region 900 at which the autonomous mobile device 200b can stop as a new stop position. The autonomous mobile device 200b can thus move to the new stop position and reliably deliver an item to the delivery destination 300.

The third embodiment also achieves advantages similar to those obtained by the first and second embodiments.

In the third embodiment, a position within the region 900 is calculated as a new stop position. Alternatively, among plural stoppable positions other than the previously selected stop position, the closest stoppable position to the current position of the autonomous mobile device 200b may be selected as a new stop position.

For example, if the previously selected stop position is the stoppable position 702a, among the plural stoppable positions 702b, 702c, and 702d, the closest stoppable position to the current position of the autonomous mobile device 200b may be selected as a new stop position. If the closest stoppable position to the current position of the autonomous mobile device 200b is the stoppable position 702b, the stoppable position 702b is selected as a new stop position.

The stop position may be recalculated plural times. For example, if an obstacle is detected at or near the stoppable position 702b, which is a new stop position, the closest stoppable position to the current position of the autonomous mobile device 200b may be recalculated from the stoppable positions 702c and 702d.

This configuration also achieves advantages similar to those of the third embodiment.

Modified Example of Third Embodiment

The configuration of a modified example of the third embodiment is similar to that of the third embodiment. However, the modified example differs from the third embodiment in that the closest stoppable position to the current position of the autonomous mobile device 200b is set as a new stop position.

The configuration of the autonomous delivery system 10 of the modified example of the third embodiment is similar to those of the first, second, and third embodiments, except for the above-described configuration. Elements having the same configurations as those of the first, second, and third embodiments are designated by like reference numerals, and a detailed explanation thereof will be omitted.

[Operation]

The operation of the autonomous mobile device 200b which is moving to a delivery destination 300 will be described below with reference to FIG. 21. A detailed explanation of the same step numbers as those in FIG. 20 will be omitted.

Figure 21:
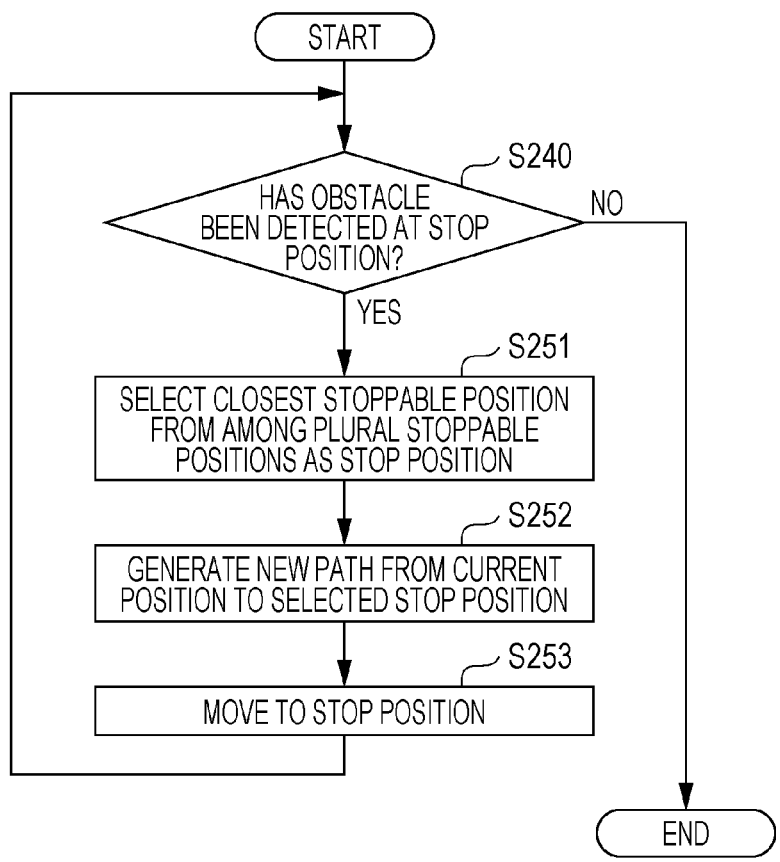
FIG. 21 is a flowchart illustrating an example of the operation of the autonomous mobile device which is moving to a delivery destination according to a modified example of the third embodiment.

FIG. 21 is a flowchart illustrating an example of the operation of the autonomous mobile device 200b which is moving to a delivery destination 300 according to the modified example of the third embodiment. In FIG. 21, the stoppable position 702a shown in FIG. 14, which is the closest stoppable position to the moving start position of the autonomous mobile device 200b, has been set as a stop position.

In step S240, when the autonomous mobile device 200b is approaching the vicinity of the stop position 702a, the obstacle detector 209 starts to detect the presence of an obstacle.

If the obstacle detector 209 has detected an obstacle at or near the stop position 702a (YES in step S240), the autonomous mobile device 200b is unable to stop at the stop position 702a. The obstacle detector 209 thus informs the stop position calculator 207 of the presence of an obstacle. In step S251, the stop position calculator 207 selects the closest stoppable position to the current position of the autonomous mobile device 200b among the plural stoppable positions 702b, 702c, and 702d, and sets the selected stoppable position as a new stop position. That is, if the obstacle detector 209 has detected an obstacle in the circular region 700a including the stop position 702a, the stop position calculator 207 selects the closest stoppable position, for example, the stoppable position 702b, to the current position of the autonomous mobile device 200b among the plural stoppable positions 702b, 702c, and 702d, and sets the selected stoppable position as a new stop position.

Then, in step S252, the path generator 203 generates a path from the current position to the new stop position, that is, the stop position 702b. The path generator 203 then outputs information indicating the generated path to the moving controller 205.

Then, in step S253, the moving controller 205 controls the moving unit 206 so that the autonomous mobile device 200b will move to the new stop position based on the generated path. The autonomous mobile device 200b moves to the stop position 702b.

The process then returns to step S240. In step S240, when the autonomous mobile device 200b is approaching the vicinity of the stop position 702b, the obstacle detector 209 starts to detect the presence of an obstacle. If the obstacle detector 209 has detected an obstacle at or near the stop position 702b (YES in step S240), the stop position calculator 207 executes processing similar to the above-described processing. For example, the stop position calculator 207 may select the closest stoppable position to the current position of the autonomous mobile device 200b from among the plural stoppable positions except for the previously selected stoppable position, and set the selected stoppable position as a new stop position. If the obstacle detector 209 has sequentially detected the presence of an obstacle at each of the stoppable positions 702a, 702b, 702c, and 702d, it may restart to detect the presence of an obstacle at the stoppable position 702a. If the obstacle detector 209 has sequentially detected the presence of an obstacle at the stoppable positions 702a, 702b, 702c, and 702d, the autonomous mobile device 200b may execute steps S241 through S243 of FIG. 20. In this case, a position within the region 900 at which the autonomous mobile device 200b can stop is selected as a stop position.

If the obstacle detector 209 has not detected an obstacle (NO in step S240), the autonomous mobile device 200b reaches the stop position 702a and delivers an item to the delivery destination 300. The autonomous mobile device 200b then completes the processing.

[Operational Advantages]

Operational advantages of the autonomous mobile device 200b according to the modified example of the third embodiment will be described below.

As discussed above, the autonomous mobile device 200b according to an aspect of the present disclosure includes the obstacle detector 209, in addition to the elements of the autonomous mobile device 200a of the second embodiment. If the obstacle detector 209 has detected an obstacle at or near a stop position, the stop position calculator 207 selects the closest stoppable position to the current position of the autonomous mobile device 200b from among plural stoppable positions except for the previously selected stoppable position, and sets the selected stoppable position as a new stop position.

With this configuration, even if the autonomous mobile device 200b fails to reach a stop position, it selects the closest stoppable position to the current position of the autonomous mobile device 200b as a new stop position from among plural stoppable positions except for the previously selected stoppable position. The autonomous mobile device 200b can thus move to the new stop position and deliver an item to the delivery destination 300. That is, as a result of the stop position calculator 207 calculating a new stop position after the obstacle detector 209 has detected an obstacle at or near a stop position, the autonomous mobile device 200b can move to the new stop position and reliably deliver an item to the delivery destination 300.

The modified example of the third embodiment also achieves advantages similar to those obtained by the first, second, and third embodiments.

Fourth Embodiment

[Configuration]

The configuration of the autonomous delivery system 10 according to a fourth embodiment will be described below.

Figure 22:
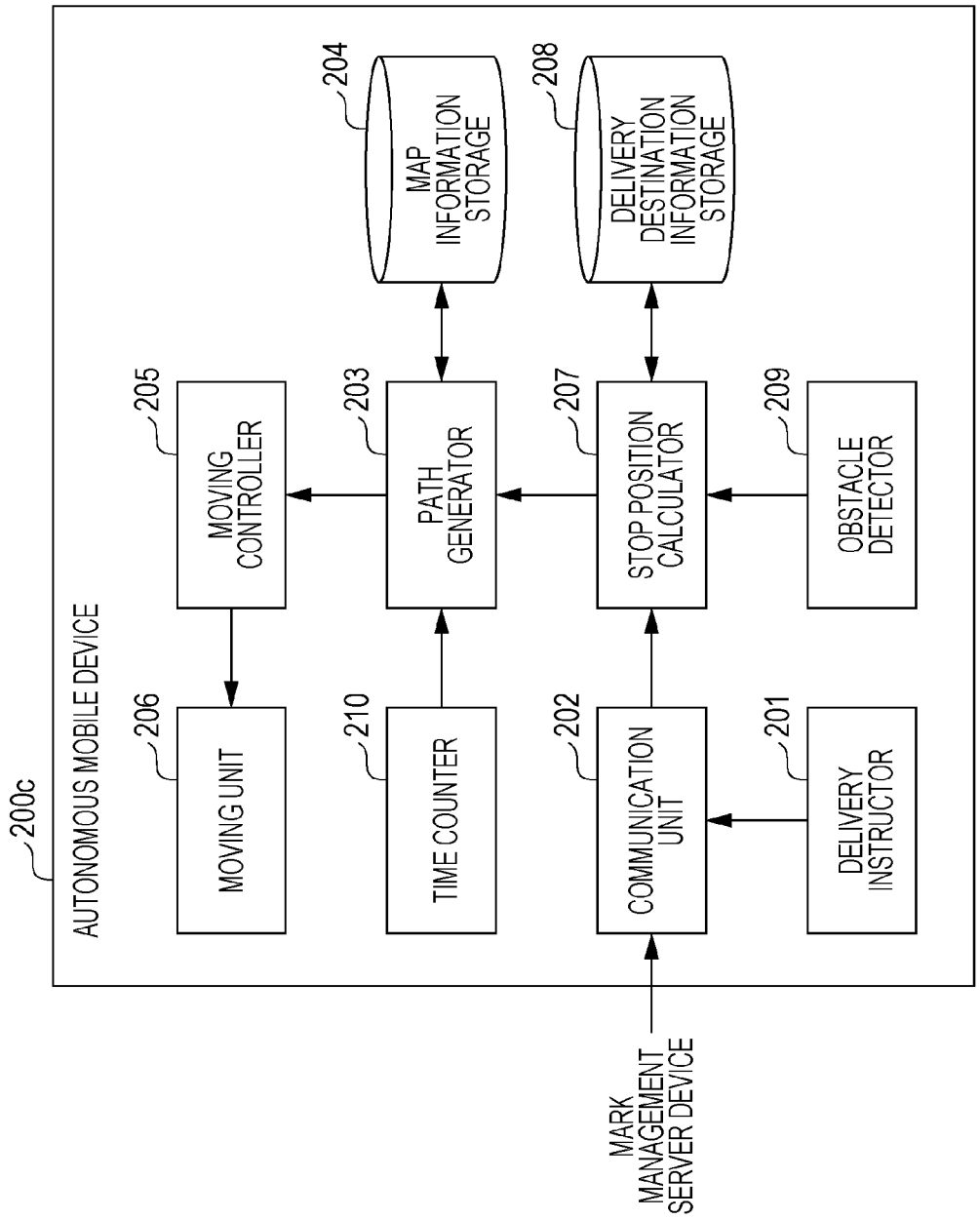
FIG. 22 is a block diagram illustrating an example of an autonomous mobile device according to a fourth embodiment.

FIG. 22 is a block diagram illustrating an example of an autonomous mobile device 200c according to the fourth embodiment.

The configuration of the fourth embodiment differs from that of the third embodiment in that, if the autonomous mobile device 200c fails to reach a target stop position within a predetermined time because of the presence of an obstacle, it stops at a first position that the autonomous mobile device 200c can reach without being influenced by obstacles.

The configuration of the autonomous delivery system 10 of the fourth embodiment is similar to those of the first, second, and third embodiments, except for the configuration of the autonomous mobile device 200c. Elements having the same configurations as those of the first, second, and third embodiments are designated by like reference numerals, and a detailed explanation thereof will be omitted.

As shown in FIG. 22, the autonomous mobile device 200c includes a time counter 210, in addition to the elements of the autonomous mobile device 200b of the third embodiment.

The time counter 210 is a timer, for example, and has the function of counting a current time and an elapsed time. The time counter 201 may be configured in any manner if it can count the time. For example, an electronic circuit that counts the time at predetermined regular intervals may be used. The time counter 210 is constituted by a CPU or an MPU, for example.

The time counter 210 counts the time elapsed from a predetermined timing. The predetermined timing is a time at which the autonomous mobile device 200c starts to deliver an item after generating a path. The predetermined timing may be a time at which the autonomous mobile device 200c passes a predetermined region. However, the predetermined timing is not restricted to these examples.

The map information storage 204 stores map information including information indicating a position 901a (FIG. 23), which is a first position at which the autonomous mobile device 200c can stop. That is, the map information storage 204 stores information indicating the first position that the autonomous mobile device 200c can reach from the moving start position without being influenced by obstacles. The information indicating the first position (position 901a) may also indicate the value of a predetermined radius or diameter, and a circular region 901 is defined by this value. The value of the predetermined radius or diameter is determined such that the circular region 901 defined by this value can be around or near the position 901a. The position 901a and the circular region 901 are a position and a region that would normally be without obstacles, such as a position or a region near the entrance or the exit of a room.

Figure 23:
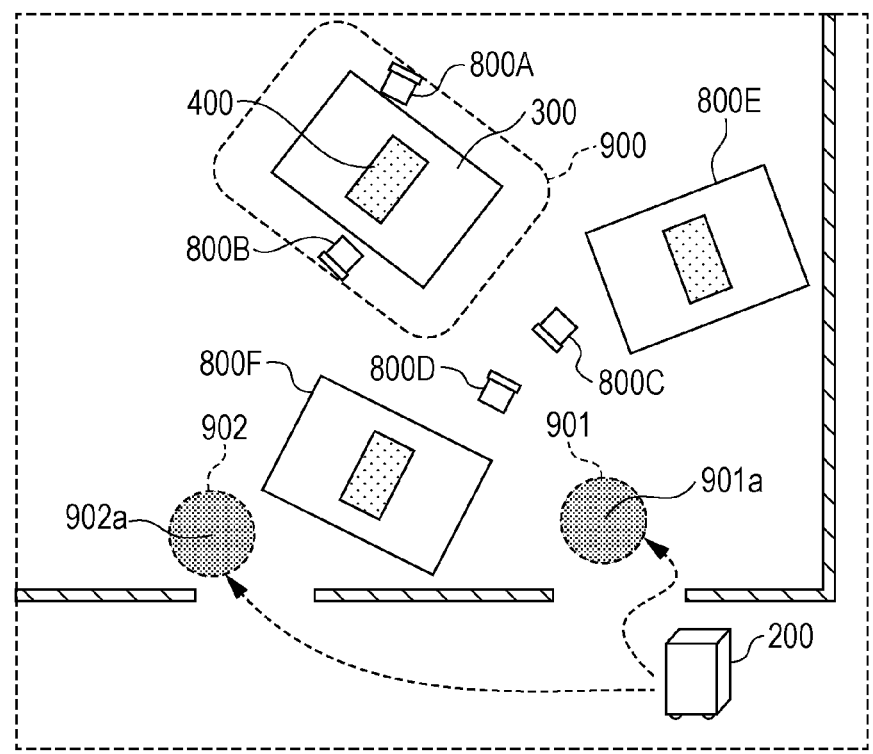
FIG. 23 is a schematic view illustrating an example of a stop position of the autonomous mobile device according to the fourth embodiment.

FIG. 23 is a schematic view illustrating an example of a stop position of the autonomous mobile device 200c according to the fourth embodiment. In FIG. 23, the position 901a corresponding to the first position is set as a stop position of the autonomous mobile device 200c. In the fourth embodiment, a path to the position 901a is calculated as a path to the delivery destination 300, however, the autonomous mobile device 200c may stop in the circular region 901 when it reaches there.

As shown in FIG. 23, in addition to obstacles 800A, 800B, 800C, and 800D, obstacles 800E and 800F are placed in the room. The autonomous mobile device 200c tries to stop at a stop position within a region 900 to deliver an item. However, this may be hindered because of the presence of the obstacles 800C, 800D, 800E, and 800F. In the fourth embodiment, if the autonomous mobile device 200c finds it difficult to reach a stop position, it sets the position 901a, which is the first position, as a new stop position, calculates a path from the current position to the new stop position, and then delivers an item there.

[Operation]

The operation executed by the autonomous mobile device 200c which is delivering an item according to the fourth embodiment will be described below with reference to FIG. 24. The autonomous mobile device 200c executes path generating processing similar to that of the second or third embodiment, and processing executed by the autonomous mobile device 200c which is moving to a delivery destination 300 after performing path generating processing will be discussed in the fourth embodiment.

Figure 24:
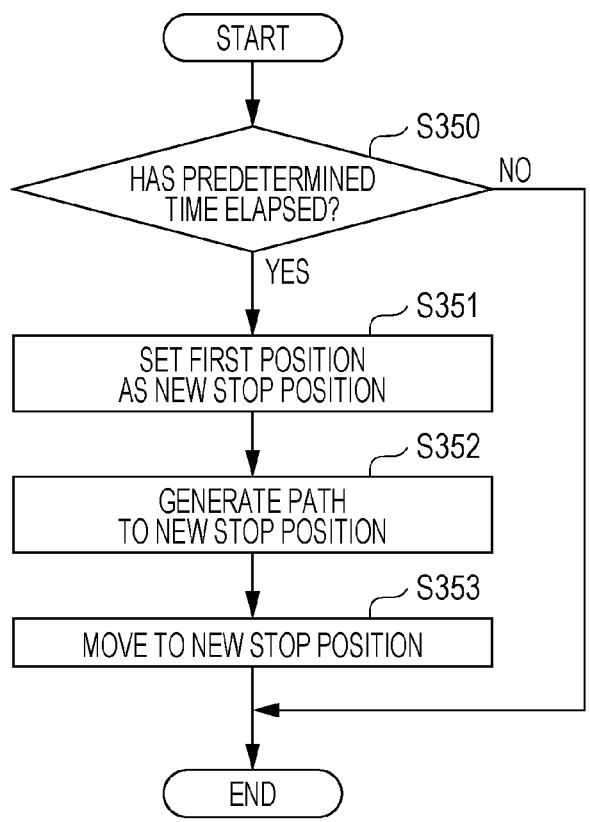
FIG. 24 is a flowchart illustrating an example of the operation of the autonomous mobile device which is moving to a delivery destination according to the fourth embodiment.

FIG. 24 is a flowchart illustrating an example of the operation of the autonomous mobile device 200c which is moving to a delivery destination 300 according to the fourth embodiment. When the autonomous mobile device 200c has started to move, a position within the region 900 has been set as a stop position at which the autonomous mobile device 200c would stop in the delivery destination 300. The path generator 203 has generated a path from the moving start position to the above-described stop position as a path to the delivery destination 300, and the autonomous mobile device 200c has started to move to the delivery destination 300 based on the generated path. The operation executed by the autonomous mobile device 200c in steps S32 and S33 of FIG. 10 will be discussed with reference to FIG. 24.

In step S350, the time counter 210 counts the time elapsed after the autonomous mobile device 200c has started to move to the delivery destination 300 and determines whether a predetermined time has elapsed.

The predetermined time is a time twice as long as an assumed time to be taken for the autonomous mobile device 200c to reach the stop position within the region 900. This assumed time is determined by the moving speed of the autonomous mobile device 200c and the distance from the moving start position to the stop position within the region 900. However, this is only an example, and the predetermined time may be defined in a different manner. Step S350 may be executed at regular intervals and is repeated until the predetermined time elapses.

If the predetermined time has elapsed (YES in step S350), the time counter 210 informs the path generator 203 that the predetermined time has elapsed. Then, in step S351, the path generator 203 reads information indicating the position 901a, which is the first position, stored in the map information storage 204, and sets the position 901a as a new stop position. That is, if the autonomous mobile device 200c fails to reach the delivery destination 300 within the predetermined time, the path generator 203 updates the stop position to the position 901a. Obstacles would not normally be placed in front of the entrance, and the position 901a is a stoppable position that the autonomous mobile device 200c can reach. The position 901a is an example of the first position.

Then, in step S352, the path generator 203 generates a new path from the current position of the autonomous mobile device 200c to the position 901a, which is the new stop position, and outputs information indicating the generated path to the moving controller 205.

In step S353, upon receiving information indicating the generated path, the moving controller 205 controls the moving unit 206 so that the autonomous mobile device 200c will move to the new stop position based on this path to deliver an item to the delivery destination 300. The autonomous mobile device 200c then completes the processing.

If the predetermined time has not elapsed (NO in step S350), the autonomous mobile device 200c continues to deliver an item and completes the processing.

[Operational Advantages]

Operational advantages of the autonomous mobile device 200c according to the fourth embodiment will be described below.

As discussed above, the autonomous mobile device 200c according to an aspect of the present disclosure includes the time counter 210 which counts the time elapsed from a predetermined timing, in addition to the elements of the autonomous mobile device 200b of the third embodiment. The map information storage 204 also stores information indicating a first position that the autonomous mobile device 200c can reach without being influenced by obstacles. If the autonomous mobile device 200c fails to reach a stop position within the predetermined time, the path generator 203 sets the first position as a new stop position and generates a path from the current position of the autonomous mobile device 200c to the new stop position as a path to the delivery destination 300.

With this configuration, even if the autonomous mobile device 200c fails to reach a stop position which has been set when the autonomous mobile device 200c has started to move, it can deliver an item to the first position, which is a position that the autonomous mobile device 200c can reach without being influenced by obstacles.

In the fourth embodiment, only one position is set as the first position. However, the map information storage 204 may store information indicating plural positions that the autonomous mobile device 200c can reach and stop from the moving start position without being influenced by obstacles.

In this case, if the autonomous mobile device 200c fails to reach a delivery destination 300 within the predetermined time, the path generator 203 may select the closest position to the previously determined stop position from among the plural positions as a new stop position.

Alternatively, the path generator 203 may select the closest position to the current position of the autonomous mobile device 200c from among the plural positions as a new stop position.

The fourth embodiment also achieves advantages similar to those obtained by the first, second, and third embodiments.

First Modified Example of Fourth Embodiment

The configuration of a first modified example of the fourth embodiment is similar to that of the fourth embodiment. In the fourth embodiment, only one piece of information indicating a position that the autonomous mobile device 200c can reach and stop from the moving start position without being influenced by obstacles is stored in the map information storage 204. In the first modified example, however, two items of such information are stored in the map information storage 204.

One position indicated by one piece of information is set as a first position, while the other position indicated by the other piece of information is set as a second position.

The first position has been discussed in the fourth embodiment, and a detailed explanation thereof will be omitted. The map information storage 204 stores map information including, in addition to the information indicating the first position, information indicating the second position at which the autonomous mobile device 200c can stop. In this example, a position 902a is the second position.

The information indicating the second position (position 902a) may also indicate the value of a predetermined radius or diameter, and a circular region 902 is defined by this value. The value of the predetermined radius or diameter is determined such that the circular region 902 defined by this value can be around or near the position 902a.

The position 902a and the circular region 902 are a position and a region that would normally be without obstacles, such as a position or a region near the entrance or the exit of a room.

In the first modified example, if the autonomous mobile device 200c fails to reach a stop position in a delivery destination 300 within a predetermined time, the path generator 203 sets one of the first and second positions that is closer to the stop position as a new stop position.

The configuration of the autonomous delivery system 10 of the first modified example of the fourth embodiment is similar to those of the first through fourth embodiments, except for the above-described configuration. Elements having the same configurations as those of the first through fourth embodiments are designated by like reference numerals, and a detailed explanation thereof will be omitted.

[Operation]

The operation executed by the autonomous mobile device 200c which is delivering an item according to the first modified example of the fourth embodiment will be described below with reference to FIG. 25.

Figure 25:
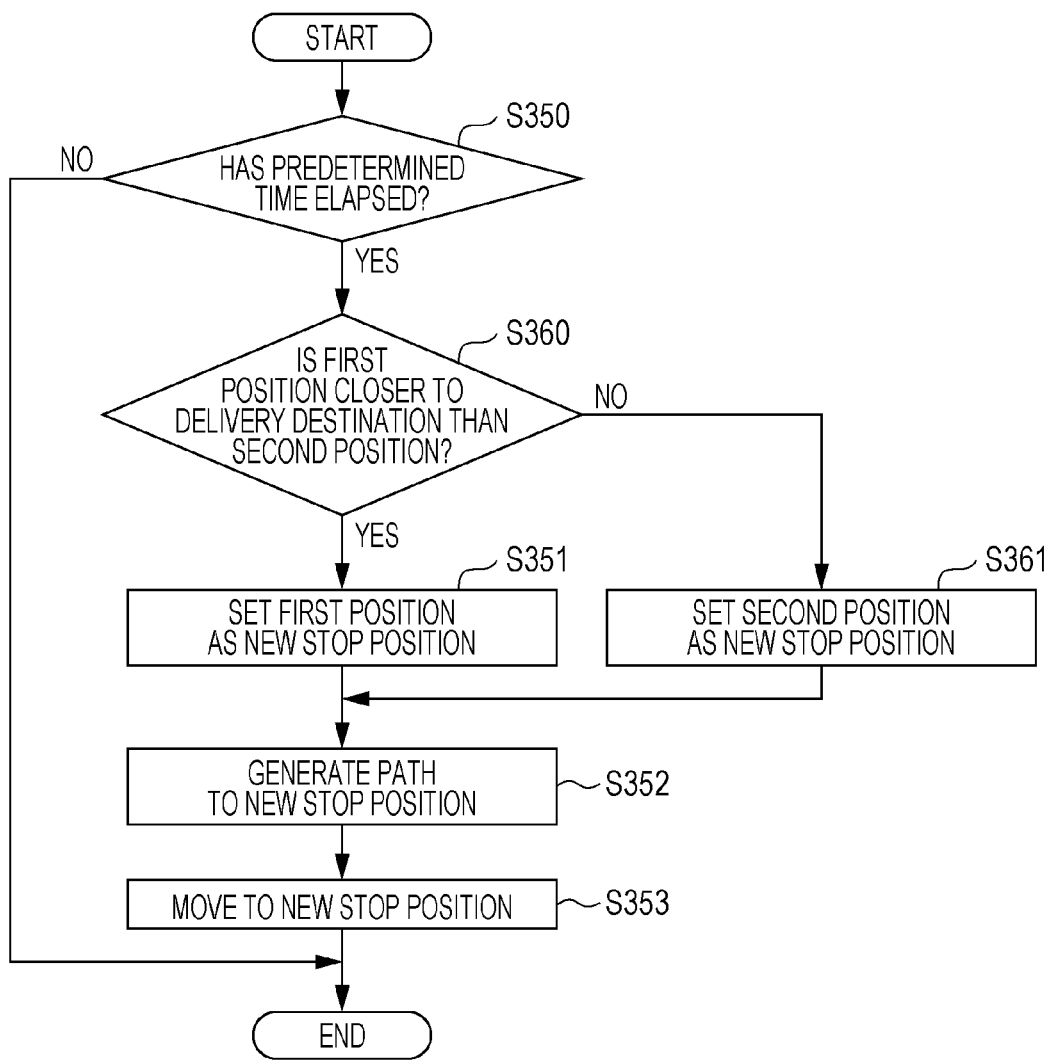
FIG. 25 is a flowchart illustrating an example of the operation of the autonomous mobile device which is moving to a delivery destination according to a first modified example of the fourth embodiment.

FIG. 25 is a flowchart illustrating an example of the operation of the autonomous mobile device 200c which is moving to a delivery destination 300 according to the first modified example of the fourth embodiment. When the autonomous mobile device 200c has started to move, a position within the region 900 has been set as a stop position at which the autonomous mobile device 200c would stop in the delivery destination 300, as in the fourth embodiment. The operation executed by the autonomous mobile device 200c in steps S32 and S33 of FIG. 10 will be discussed with reference to FIG. 25.

In step S350, the autonomous mobile device 200c determines whether a predetermined time has elapsed. If the predetermined time has elapsed (YES in step S350), the time counter 210 informs the path generator 203 that the predetermined time has elapsed. Then, in step S360, the stop position calculator 207 determines which one of the position 901a, which is the first position, and the position 902a, which is the second position, is closer to the delivery destination 300. For example, the stop position calculator 207 reads information indicating the position 901a and information indicating the position 902a from the map information storage 204, and determines whether the position 901a is closer to the stop position in the delivery destination 300 than the position 902a is. The determination result is output to the path generator 203. If the position 901a is closer to the stop position than the position 902a is (YES in step S360), the path generator 203 sets the position 901a stored in the map information storage 204 as a new stop position in step S351. That is, if the autonomous mobile device 200c fails to reach the delivery destination 300 within the predetermined time, the path generator 203 sets one of the first and second positions that is closer to the delivery destination 300 as a new stop position.

That is, the stop position in the delivery destination 300 is updated to the position 901a.

Then, in step S352, the path generator 203 generates a new path from the current position of the autonomous mobile device 200c to the position 901a, and outputs information indicating the generated path to the moving controller 205.

In step S353, upon receiving information indicating the generated path, the moving controller 205 controls the moving unit 206 so that the autonomous mobile device 200c will move to the new stop position in the delivery destination 300 based on this path. The autonomous mobile device 200c then completes the processing.

If the position 901a is not closer to the stop position than the position 902a is (NO in step S360), the path generator 203 sets the position 902a stored in the map information storage 204 as a new stop position in step S361. That is, the stop position in the delivery destination 300 is updated to the position 902a.

Then, in step S352, the path generator 203 generates a new path from the current position of the autonomous mobile device 200c to the position 902a, and outputs information indicating the generated path to the moving controller 205.

In step S353, upon receiving information indicating the generated path, the moving controller 205 controls the moving unit 206 so that the autonomous mobile device 200c will move to the new stop position in the delivery destination 300 based on this path.

If the predetermined time has not elapsed (NO in step S350), the autonomous mobile device 200c continues to deliver an item and completes the processing.

[Operational Advantages]

Operational advantages of the autonomous mobile device 200c according to the first modified example of the fourth embodiment will be described below.

As discussed above, the autonomous mobile device 200c according to an aspect of the present disclosure includes the time counter 210 which counts the time elapsed from a predetermined timing, in addition to the elements of the autonomous mobile device 200b of the third embodiment. The map information storage 204 at least stores information indicating the first position and information indicating the second position that the autonomous mobile device 200c can reach without being influenced by obstacles. If the autonomous mobile device 200c fails to reach a stop position in the delivery destination 300 within the predetermined time, the path generator 203 sets one of the first and second positions that is closer to the stop position as a new stop position.

The above-described configuration enables the autonomous mobile device 200c to reliably reach a new stop position to deliver an item and also to move to a position close to a user ordered the item, thereby enhancing the convenience of the autonomous mobile device 200c.

Second Modified Example of Fourth Embodiment

The configuration of the second modified example of the fourth embodiment is similar to that of the first modified example. In the first modified example, one of the first and second positions that is closer to a stop position of the autonomous mobile device 200*c* is set as a new stop position. In the second modified example, one of the first and second positions that is closer to the current position of the autonomous mobile device 200*c* is set as a new stop position.

The configuration of the autonomous delivery system 10 of the second modified example of the fourth embodiment is similar to those of the first through fourth embodiments, except for the above-described configuration. Elements having the same configurations as those of the first through fourth embodiments are designated by like reference numerals, and a detailed explanation thereof will be omitted.

[Operation]

The operation executed by the autonomous mobile device 200*c* which is delivering an item according to the second modified example of the fourth embodiment will be described below with reference to FIG. 26.

Figure 26:
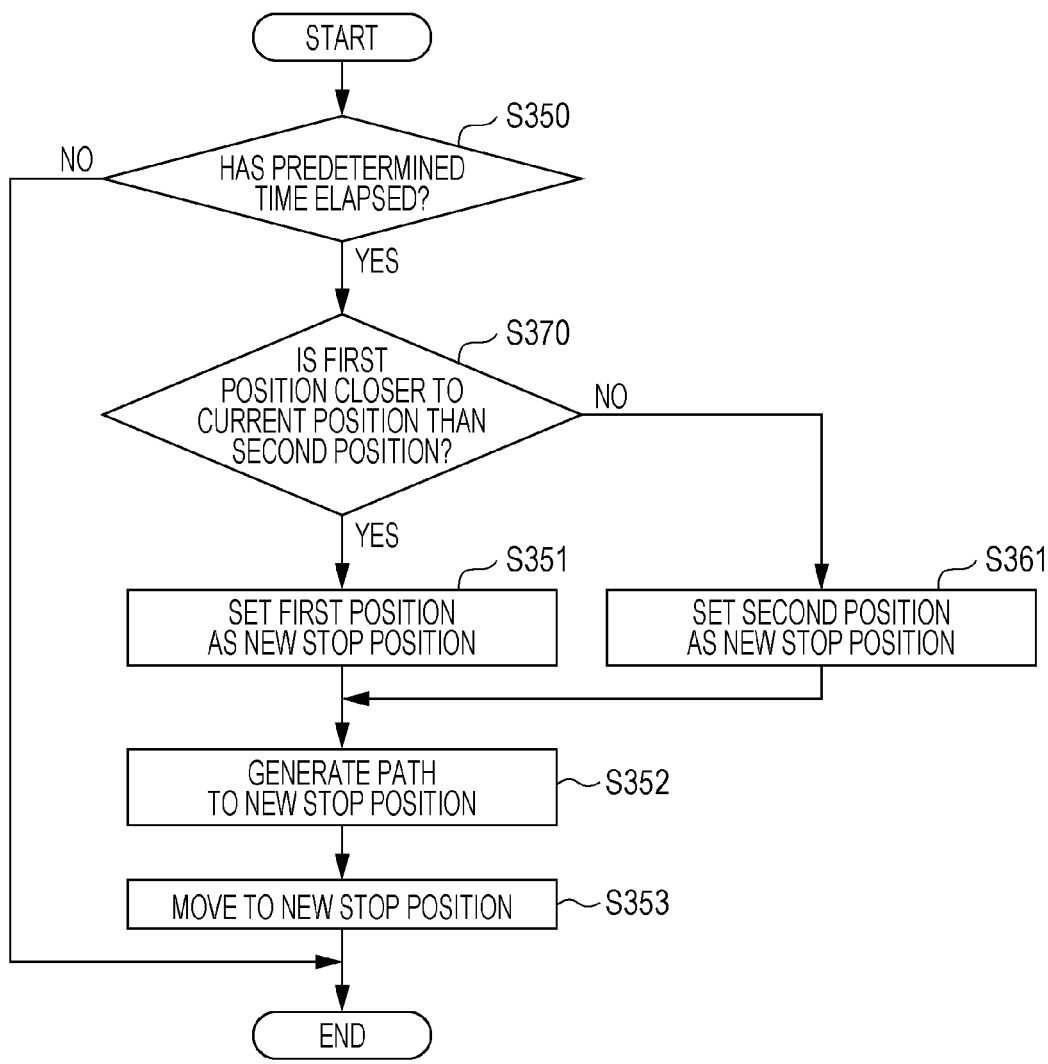
FIG. 26 is a flowchart illustrating an example of the operation of the autonomous mobile device which is moving to a delivery destination according to a second modified example of the fourth embodiment.

FIG. 26 is a flowchart illustrating an example of the operation of the autonomous mobile device 200*c* which is moving to a delivery destination 300 according to the second modified example of the fourth embodiment. When the autonomous mobile device 200*c* has started to move, a position within the region 900 has been set as a stop position at which the autonomous mobile device 200*c* would stop in the delivery destination 300, as in the first modified example. The operation executed by the autonomous mobile device 200*c* in steps S32 and S33 of FIG. 10 will be discussed with reference to FIG. 26.

In step S350, the autonomous mobile device 200*c* determines whether a predetermined time has elapsed. If the predetermined time has elapsed (YES in step S350), the time counter 210 informs the path generator 203 that the predetermined time has elapsed. Then, in step S370, the stop position calculator 207 reads information indicating the position 901*a*, which is the first position, and information indicating the position 902*a*, which is the second position, from the map information storage 204, and determines whether the position 901*a* is closer to the current position of the autonomous mobile device 200*c* than the position 902*a* is. The determination result is output to the path generator 203.

If the position 901*a* is closer to the current position of the autonomous mobile device 200*c* than the position 902*a* is (YES in step S370), the path generator 203 sets the position 901*a* stored in the map information storage 204 as a new stop position in step S351. That is, if the autonomous mobile device 200*c* fails to reach the delivery destination 300 within the predetermined time, the path generator 203 sets one of the first and second positions that is closer to the current position of the autonomous mobile device 200*c* as a new stop position.

Then, in step S352, the path generator 203 generates a new path from the current position of the autonomous mobile device 200*c* to the position 901*a*, and outputs information indicating the generated path to the moving controller 205.

If the position 901*a* is not closer to the current position of the autonomous mobile device 200*c* than the position 902*a* is (NO in step S370), the path generator 203 sets the position 902*a* stored in the map information storage 204 as a new stop position in step S361. That is, the stop position in the delivery destination 300 is updated to the position 902*a*.

Then, in step S352, the path generator 203 generates a new path from the current position of the autonomous mobile device 200*c* to the position 902*a*, and outputs information indicating the generated path to the moving controller 205.

In step S353, upon receiving information indicating the generated path, the moving controller 205 controls the moving unit 206 so that the autonomous mobile device 200*c* will move to the new stop position in the delivery destination 300 based on this path.

If the predetermined time has not elapsed (NO in step S350), the autonomous mobile device 200*c* continues to deliver an item and completes the processing.

[Operational Advantages]

Operational advantages of the autonomous mobile device 200*c* according to the second modified example of the fourth embodiment will be described below.

As discussed above, the autonomous mobile device 200*c* according to an aspect of the present disclosure includes the time counter 210 which counts the time elapsed from a predetermined timing, in addition to the elements of the autonomous mobile device 200*b* of the third embodiment. The map information storage 204 also stores information indicating the second position that the autonomous mobile device 200*c* can reach and stop without being influenced by obstacles. If the autonomous mobile device 200*c* fails to reach a stop position in the delivery destination 300 within the predetermined time, the path generator 203 sets one of the first and second positions that is closer to the current position of the autonomous mobile device 200*c* as a new stop position.

The above-described configuration enables the autonomous mobile device 200*c* to reliably reach a new stop position to deliver an item and also to suppress a decrease in the operation efficiency of the autonomous mobile device 200*c*.

The first and second modified examples of the fourth embodiment also achieve advantages similar to those obtained by the first through fourth embodiments.

Fifth Embodiment

The configuration of a fifth embodiment is similar to that of the fourth embodiment. However, the fifth embodiment differs from the fourth embodiment in that an autonomous mobile device 200 delivers items to plural delivery destinations 300. The configuration of the autonomous delivery system 10 of the fifth embodiment is similar to those of the first through fourth embodiments, except for the above-described configuration. Elements having the same configurations as those of the first through fourth embodiments are designated by like reference numerals, and a detailed explanation thereof will be omitted.

In the following example, the delivery destination 300 discussed in the first through fourth embodiments is set as a first delivery destination, the object, which is the delivery destination 300 discussed in the first embodiment, is set as a first object, and the mark 400 discussed in the first embodiment is set as a first mark. The mark information concerning the mark 400 discussed in the first embodiment is set as first mark information. In the fifth embodiment, a second object different from the first object is placed in a delivery area and is set as a second delivery destination. A second mark is attached to the second object. The mark ID of the first mark and that of the second mark are different from each other. The first and second objects are tables. These two tables are physically different tables.

The second object, the second delivery destination, and the second mark are respectively the same as the object, the delivery destination, and the mark discussed in the first embodiment, and a detailed explanation thereof will be omitted.

Delivery destinations include the first and second delivery destinations. That is, the autonomous mobile device 200 delivers items to plural delivery destinations. The autonomous mobile device 200 delivers an item to the first delivery destination preferentially over the second delivery destination. That is, the delivery order is determined. The delivery order may be determined by the staff of a store which delivers items. The path generator 203 may generate a path in order of increasing distance from the current position to the stop positions calculated by the stop position calculator 207. The autonomous mobile device 200 may deliver items to three or more delivery destinations.

After the autonomous mobile device 200 has delivered an item to the first delivery destination, the path generator 203 generates a path from the current position of the autonomous mobile device 200, that is, the stop position where the autonomous mobile device 200 has stopped in the first delivery destination, to the second delivery destination. The moving controller 205 then controls the moving unit 206 so that the autonomous mobile device 200 can deliver an item to the second delivery destination based on this path. If there is a third delivery destination, the path generator 203 generates a path from the current position of the autonomous mobile device 200 to the third delivery destination, and the moving controller 205 controls the moving unit 206 so that the autonomous mobile device 200 can deliver an item to the third delivery destination based on this path.

[Operation]

The operation executed by the autonomous mobile device 200 which is delivering items according to the fifth embodiment will be described below with reference to FIGS. 27A and 27B.

Figure 27A:
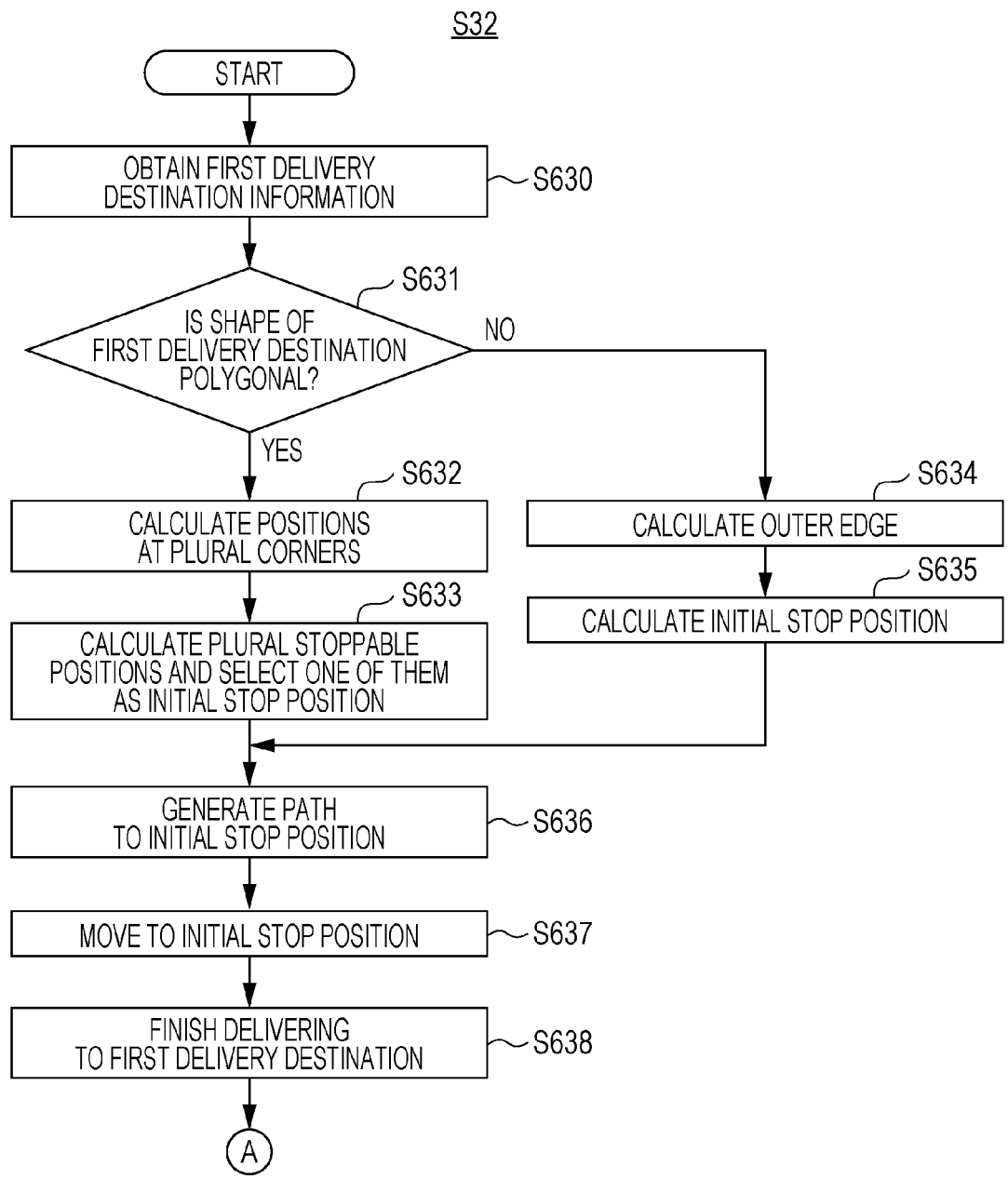
FIGS. 27A and 27B are a flowchart illustrating an example of the operation of an autonomous mobile device which is moving to plural delivery destinations according to a fifth embodiment.
Figure 27B:
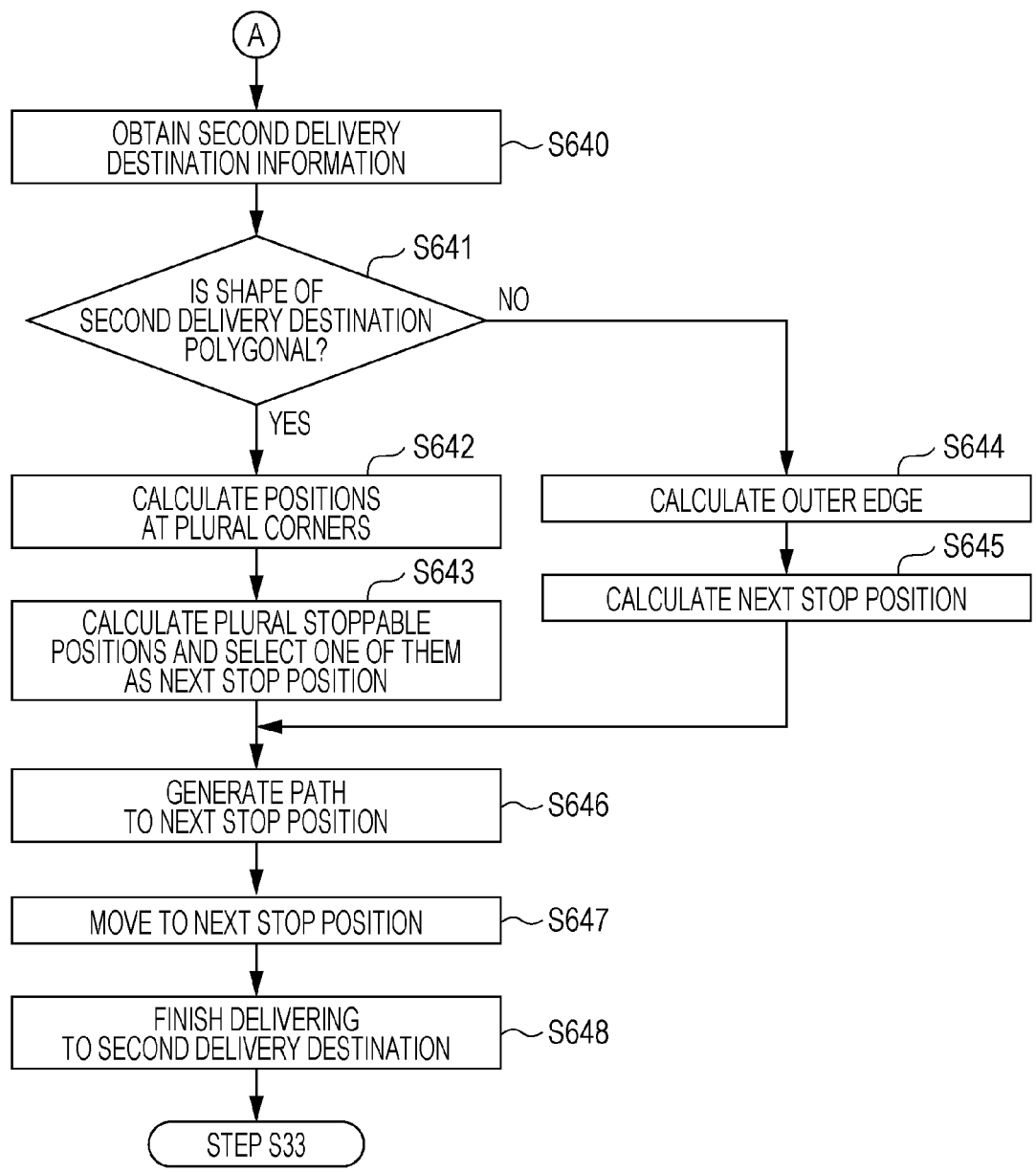

FIGS. 27A and 27B are a flowchart illustrating an example of the operation of the autonomous mobile device 200 which is moving to plural delivery destinations according to the fifth embodiment. After step S638 in FIG. 27A, step S640 in FIG. 27B is executed. Details of steps S638 and S640 will be discussed later. The specific operation of path generating processing will be discussed with reference to FIGS. 27A and 27B. Two stop positions are set as stop positions of the autonomous mobile device 200. The operation executed by the autonomous mobile device 200 in steps S32 and S33 of FIG. 10 will be discussed with reference to FIGS. 27A and 27B.

In step S630, by using the mark ID indicated by the first mark information received from the mark management server device 500 by the communication unit 202, the stop position calculator 207 obtains first delivery destination information indicating the shape and the size of a table, which is the first delivery destination corresponding to this mark ID, from the delivery destination information storage 208.

Then, the stop position calculator 207 determines in step S631 whether the shape of the table, which is the first delivery destination, indicated by the first delivery destination information obtained in step S630 is polygonal.

If the shape of the table is polygonal (YES in step S631), the stop position calculator 207 calculates the positions of the corners of the table in step S632.

In step S633, the stop position calculator 207 calculates stoppable positions concerning the positions of the plural corners calculated in step S632. The stop position calculator 207 then selects one of the plural stoppable positions as a stop position. The selected stoppable position is also called the initial stop position. The initial stop position is a position at which the autonomous mobile device 200 will stop in the first delivery destination. The stop position calculator 207 outputs information indicating the initial stop position to the path generator 203.

If the shape of the table, which is the first delivery destination, is not polygonal (NO in step S631), the stop position calculator 207 calculates the position of the outer edge 302 of the first delivery destination in step S634. To calculate the position of the outer edge 302, the stop position calculator 207 calculates the center position of the first delivery destination from the positions of the base points based on the first delivery destination information.

Then, in step S635, by using the outer edge 302 calculated in step S634, the stop position calculator 207 calculates a region defined by a second distance from the outer edge 302, and then sets a position within this region and without obstacles as an initial stop position. The stop position calculator 207 outputs information indicating the initial stop position to the path generator 203.

In step S636, upon receiving information indicating the initial stop position from the stop position calculator 207, the path generator 203 generates a path from the moving start position to the initial stop position as a path to the first delivery destination.

In step S637, upon receiving information indicating the path generated by the path generator in step S636, the moving controller 205 controls the moving unit 206 so that the autonomous mobile device 200 will move to the initial stop position based on this path. When the autonomous mobile device 200 reaches the initial stop position, it stops moving and completes delivery processing in step S638.

Then, in step S640 of FIG. 27B, by using the mark ID indicated by the second mark information received from the mark management server device 500 by the communication unit 202, the stop position calculator 207 obtains second delivery destination information indicating the shape and the size of a table, which is the second delivery destination corresponding to this mark ID, from the delivery destination information storage 208.

Then, the stop position calculator 207 determines in step S641 whether the shape of the table, which is the second delivery destination, indicated by the second delivery destination information is polygonal.

If the shape of the table is polygonal (YES in step S641), the stop position calculator 207 calculates the positions of the corners of the table in step S642.

In step S643, the stop position calculator 207 calculates stoppable positions concerning the positions of the plural corners calculated in step S642. The stop position calculator 207 then selects one of the plural stoppable positions as a stop position. The selected stoppable position is also called the next stop position. The next stop position is a position at which the autonomous mobile device 200 will stop in the second delivery destination. The stop position calculator 207 outputs information indicating the next stop position to the path generator 203.

If the shape of the table is not polygonal (NO in step S641), the stop position calculator 207 calculates the position of the outer edge 302 of the second delivery destination in step S644. To calculate the position of the outer edge 302, the stop position calculator 207 calculates the center position of the second delivery destination from the positions of the base points based on the second delivery destination information.

Then, in step S645, by using the outer edge 302 calculated in step S644, the stop position calculator 207 calculates a region defined by the second distance from the outer edge 302, and then sets a position within this region and without obstacles as the next stop position. The stop position calculator 207 outputs information indicating the next stop position to the path generator 203.

In step S646, upon receiving information indicating the next stop position from the stop position calculator 207, the path generator 203 generates a path from the current position, which is the initial stop position, to the next stop position as a path to the second delivery destination.

In step S647, upon receiving information indicating the path generated by the path generator in step S646, the moving controller 205 controls the moving unit 206 so that the autonomous mobile device 200 will move to the next stop position based on this path. When the autonomous mobile device 200 reaches the next stop position, it stops moving and completes delivery processing in step S648.

[Operational Advantages]

Operational advantages of the autonomous mobile device 200 according to the fifth embodiment will be described below.

As discussed above, in the autonomous mobile device 200 according to an aspect of the present disclosure, the delivery destination 300 includes first and second delivery destinations, after the autonomous mobile device 200 has delivered an item to the first delivery destination, the path generator 203 generates a path from the current position of the autonomous mobile device 200 to the second delivery destination, and the moving controller 205 controls the moving unit 206 so that the autonomous mobile device 200 will deliver an item to the second delivery destination based on the generated path.

To deliver an item to the first delivery destination, the autonomous mobile device 200 stops at the initial stop position. After the autonomous mobile device 200 has delivered an item to the first delivery destination, the path generator 203 generates a path from the initial stop position, which is the current position of the autonomous mobile device 200, to the second delivery destination. This configuration enables the autonomous mobile device 200 to deliver an item to the second delivery destination based on the generated path after delivering an item to the first delivery destination. The autonomous mobile device 200 is thus able to deliver items to plural delivery destinations 300, thereby enhancing the operation efficiency of the autonomous mobile device 200.

The fifth embodiment also achieves advantages similar to those obtained by the first through fourth embodiments.

Sixth Embodiment

[Configuration]

The configuration of an autonomous delivery system 10 according to a sixth embodiment will be described below with reference to FIG. 28.

Figure 28:
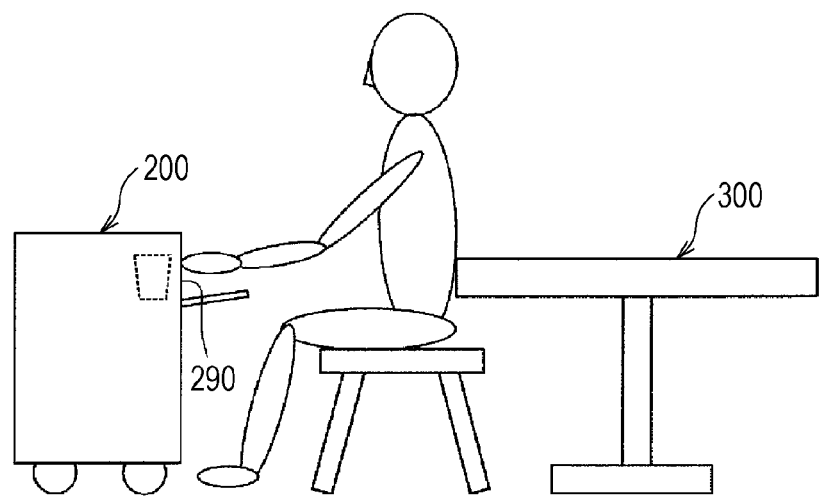
FIG. 28 is a schematic view illustrating a state in which an autonomous mobile device has delivered an item to a delivery destination according to a sixth embodiment.

FIG. 28 is a schematic view illustrating a state in which an autonomous mobile device 200 has delivered an item to a delivery destination 300 according to the sixth embodiment.

The configuration of the sixth embodiment is similar to that of the fifth embodiment. However, the sixth embodiment differs from the fifth embodiment in that the autonomous mobile device 200 calculates, not only a stop position of the autonomous mobile device 200, but also a stop direction of the autonomous mobile device 200. The configuration of the autonomous delivery system 10 of the sixth embodiment is similar to those of the first through fifth embodiments, except for the above-described configuration. Elements having the same configurations as those of the first through fifth embodiments are designated by like reference numerals, and a detailed explanation thereof will be omitted.

The stop position calculator 207 calculates a stop direction in which the autonomous mobile device 200 will face when it stops in a delivery destination 300. The moving controller 205 then causes the autonomous mobile device 200 to stop in the calculated stop direction when it reaches the delivery destination 300. As shown in FIG. 28, the autonomous mobile device 200 includes a mounting portion on which an item to be delivered is mounted within an internal space of the autonomous mobile device 200, and an item can be removed from the autonomous mobile device 200 via a slot 290. The stop direction is a direction in which the slot 290 faces the delivery destination 300. More specifically, causing the autonomous mobile device 200 to face in the stop direction means that the slot 290 faces the delivery destination 300, such as a table.

The stop direction may be calculated in the following manner. The stop position calculator 207 calculates a stop position by using mark information, for example, and when the autonomous mobile device 200 reaches the stop position, the moving controller 205 controls the moving unit 206 so that the slot 290 will face the delivery destination 300, such as a table.

[Operational Advantages]

Operational advantages of the autonomous mobile device 200 according to the sixth embodiment will be described below.

As discussed above, in the autonomous mobile device 200 according to an aspect of the present disclosure, the stop position calculator 207 calculates a stop direction in which the autonomous mobile device 200 will face when it stops, and the moving controller 205 causes the autonomous mobile device 200 to stop facing in the stop direction when the autonomous mobile device 200 reaches a delivery destination 300.

In this manner, when the autonomous mobile device 200 reaches the delivery destination 300, it stops in a calculated stop direction. If the autonomous mobile device 200 stops in the calculated stop direction so that a user can easily remove a delivered item, the convenience to the user is enhanced. That is, as a result of the stop position calculator 207 calculating a stop direction to stop the autonomous mobile device 200 facing toward the center of the delivery destination 300, the user can easily remove a delivered item.

The sixth embodiment also achieves advantages similar to those obtained by the first through fifth embodiments.

Other Modified Examples

The autonomous mobile devices, the autonomous delivery systems, the delivery methods, and the recording media according to the first through sixth embodiments, the modified example of the second embodiment, the modified example of the third embodiment, and the first and second modified examples of the fourth embodiment have been described. However, the present disclosure is not restricted to these embodiments and modified examples.

For example, the imaging unit 101 of the imaging device 100 according to the above-described embodiments and modified examples may perform only imaging operation and generate an image and send information indicating the generated image to a terminal device. The terminal device may be a smartphone or a tablet device. The terminal device may cause a dedicated application to detect a mark ID indicating a mark and the coordinates of base points of the mark from the image. The dedicated application may generate image spatial coordinates representing the positions of the base points from information indicating the mark ID and the coordinates of the base points, and may transform the image spatial coordinates into map spatial coordinates. The dedicated application may calculate the orientation of the mark with respect to the map spatial coordinates. The dedicated application may then send mark information indicating the mark ID and the mark orientation to the mark management server device 500. Accordingly, steps S11 through S15 of FIG. 8 may not necessarily be executed by the imaging device 100, and instead, may be executed by a dedicated application used by a terminal device. Such a dedicated application may be stored in the imaging device 100, a PC connected to the imaging device 100, or the mark management server device 500.

When the autonomous mobile devices 200 through 200c according to the above-described embodiments and modified examples reach a delivery destination, they may not necessarily be exactly superposed on a stop position as viewed from above. Instead, if the autonomous mobile devices 200 through 200c partially contact a stop position or are partially superposed on a stop position when they reach a delivery destination, it may be assumed that the delivery operation has been completed.

After the autonomous mobile devices 200 through 200c according to the above-described embodiments and modified examples have delivered an item to a delivery destination, a user may remove the item and press a button. At this time, the autonomous mobile devices 200 through 200c may return to the moving start position, such as the kitchen in a café. When the autonomous mobile devices 200 through 200c sense by using a sensor, for example, that a user has removed an item, they may automatically return to the moving start position.

Each of the processors included in the autonomous mobile devices 200 through 200c and the autonomous delivery systems 10 according to the above-described embodiments and modified examples is implemented by a large scale integrated (LSI) circuit, which is a typical example of integrated circuits. These processors may be formed into individual chips, or some or all of the processors may be formed into one chip.

The integration technology of the processors is not restricted to an LSI technology. Instead, a dedicated circuit or a general-purpose processor may be used. For example, an FPGA that is programmable after it is manufactured, or a reconfigurable processor that may reconfigure connections or settings of circuit cells within this processor may be used.

The individual elements according to the above-described embodiments and modified examples may be implemented by dedicated hardware or by executing a software program suitable for the elements. The elements may be implemented as a result of a CPU or a program executing unit such as a processor reading and executing a software program recorded on a recording medium, such as a hard disk or a semiconductor memory.

The numeric values used in the above-described embodiments and modified examples are only examples for specifically describing the present disclosure. Embodiments and modified examples of the present disclosure are not restricted by the above-described numeric values.

The state in which the functions are divided in the functional block diagrams is an only example. Some of the functional blocks may be combined into one block, one functional block may be divided into plural blocks, and one or plural functional blocks may be transferred to another functional block or other functional blocks. Similar functions of plural functional blocks may be processed by single hardware or software in parallel or in a time division manner.

The order of steps executed in each flowchart is only an example for specifically describing the present disclosure. The orders of steps are not restricted to those in the above-described embodiments and modified examples. One or some of the steps may be executed together with another step or other steps simultaneously (in parallel).

The autonomous mobile devices, autonomous delivery systems, delivery methods, and recording media according to one or plural aspects of the present disclosure have been described through the above-described embodiments and modified examples. However, the present disclosure is not restricted to the above-described embodiments and modified examples. Various modifications apparent to those skilled in the art may be made to the above-described embodiments and modified examples without departing from the scope and spirit of the disclosure. Components in the above-described embodiments and modified examples may be combined to realize other embodiments. Such modifications and embodiments may also be encompassed within one or plural aspects of the present disclosure.

The autonomous delivery systems according to one or plural aspects of the present disclosure are effectively used for delivering items to destinations which are possible to be displaced due to a change in the layout, in places, such as cafés, restaurants, fast food restaurants, food courts, offices, amusement arcades, casinos, event spaces, break rooms, factories, hospitals, and schools.

What is claimed is:

1. An autonomous mobile device comprising:
   a mounter on which an item to be delivered is mounted;
   a communication circuit that receives first mark information from a mark management server device, the first mark information being stored in a memory of the mark management server device, the first mark information being sent from an imaging device that images a delivery area of the autonomous mobile device to the mark management server device, the first mark information including identification information concerning a first mark and position information indicating a position of the first mark in a map space, the first mark being attached to a first object placed within the delivery area, upon receiving a piece of the first mark information from the imaging device, the mark management server device updating the first mark information stored in the memory of the mark management server device with the piece of the first mark information received from the imaging device,
   wherein the first mark is a machine readable printed pattern, which provides the first mark information upon reading of the first mark;
   a memory that stores map information concerning the delivery area;
   a path generating circuit that
      sets the first object to which the first mark is attached as a first delivery destination, and
      generates a path from a moving start position of the autonomous mobile device to the first delivery destination based on the first mark information and the map information, wherein the path from the moving start position to the first delivery destination is first generated in response to receiving the first mark information; and a control circuit that controls the autonomous mobile device to move to the first delivery destination based on the path, wherein, while the autonomous mobile device is moving to the first delivery destination, if the communication circuit receives a piece of the first mark information from the mark management server device, the path generating circuit generates a second path from a current position of the autonomous mobile device to the first delivery destination, based on the piece of the first mark information received from the mark management server device and the map information, and the control circuit controls the autonomous mobile device to move based on the second path, wherein, when the camera images the delivery area to generate an image, the camera generates, as the piece of the first mark information, information including the identification information concerning the first mark and the position information indicating the position of the first mark in the map space, based on the generated image, and the camera sends the piece of the first mark information to the mark management server device wherein the autonomous mobile device further comprises:

a second memory that stores first delivery destination information including the identification information concerning the first mark and information concerning a shape and a size of the first object; and a processor that calculates a stop position at which the autonomous mobile device is to stop in the first delivery destination, based on the first delivery destination information and the first mark information, wherein the path generating circuit generates a third path from the moving start position or the current position of the autonomous mobile device to the stop position as a path to the first delivery destination, wherein the camera calculates an orientation of the first mark, and sends, as the first mark information, information including the identification information concerning the first mark, the position information indicating the position of the first mark in the map space, and information indicating the orientation of the first mark to the mark management server device, and wherein, if the shape of the first object, which is the first delivery destination, is polygonal having a plurality of corners, the processor calculates a position of each of the plurality of corners of the first object, which is the first delivery destination, calculates a plurality of stoppable positions that are separated by a first distance from the positions of the plurality of corners of the first object, selects, among the plurality of stoppable positions, a first stoppable position that is closest in distance to the moving start position of the autonomous mobile device, and sets the selected first stoppable position as the stop position.

2. The autonomous mobile device according to claim 1, wherein:

the camera also calculates an orientation of the first mark; and the camera sends, as the first mark information, information including the identification information concerning the first mark, the position information indicating the position of the first mark in the map space, and information indicating the orientation of the first mark to the mark management server device.

3. The autonomous mobile device according to claim 1, wherein:

the camera calculates an orientation of the first mark, and sends, as the first mark information, information including the identification information concerning the first mark, the position information indicating the position of the first mark in the map space, and information indicating the orientation of the first mark to the mark management server device; and if the shape of the first object, which is the first delivery destination, is polygonal, the processor calculates a position of a corner of the first object, based on the first delivery destination information and the first mark information, and sets a position separated from the position of the corner of the first object by a first distance as the stop position.

4. The autonomous mobile device according to claim 3, further comprising:

a sensor that detects an obstacle, wherein, if the obstacle is detected in a region including the stop position by the sensor, the processor calculates a position of an outer edge of the first object, which is the first delivery destination, based on the first delivery destination information and the first mark information, calculates a region defined by a second distance from the outer edge of the first object, and sets a position included in the region as the stop position.

5. The autonomous mobile device according to claim 1, wherein the processor calculates a position of an outer edge of the first object, which is the first delivery destination, based on the first delivery destination information and the first mark information, calculates a region defined by a second distance from the outer edge of the first object, and sets a position included in the region as the stop position.

6. The autonomous mobile device according to claim 1, further comprising:

a sensor that detects an obstacle, wherein, if the obstacle is detected at the stop position by the sensor, the processor selects a second stoppable position that is closest to a current position of the autonomous mobile device from among the plurality of stoppable positions other than the previously selected stoppable position, and sets the selected second stoppable position as the stop position.

7. The autonomous mobile device according to claim 1, further comprising:

a timing circuit counts a time elapsed from a predetermined timing, wherein the first memory further stores information indicating a first position that the autonomous mobile device is able to reach without being influenced by obstacles, and if the autonomous mobile device fails to reach the first delivery destination within a predetermined time, the path generating circuit sets the first position as a new stop position and generates a fourth path from a current position of the autonomous mobile device to the new stop position as a path to the first delivery destination.

8. The autonomous mobile device according to claim 7, wherein:

the first memory further stores information indicating a second position that the autonomous mobile device is able to reach without being influenced by obstacles; and if the autonomous mobile device fails to reach the first delivery destination within the predetermined time, the path generating circuit sets one of the first and second positions that is closer to the stop position as the new stop position.

9. The autonomous mobile device according to claim 7, wherein:

the first memory also stores information indicating a second position that the autonomous mobile device is able to reach without being influenced by obstacles; and if the autonomous mobile device fails to reach the first delivery destination within the predetermined time, the path generating circuit sets one of the first and second positions that is closer to the current position of the autonomous mobile device as the new stop position.

10. The autonomous mobile device according to claim 1, wherein:

the processor also calculates a stop direction in which the autonomous mobile device is to face when the autonomous mobile device stops; and the control circuit causes the autonomous mobile device to stop facing in the calculated stop direction when the autonomous mobile devices reaches the first delivery destination.

11. The autonomous mobile device according to claim 1, wherein:

second mark information sent from the camera is stored in the memory of the mark management server device, the second mark information including identification information concerning a second mark and position information indicating a position of the second mark in the map space, the second mark being attached to a second object placed within the delivery area, upon receiving a piece of the second mark information from the camera, the mark management server device updates the second mark information stored in the memory of the mark management server device to the received piece of the second mark information; and if the autonomous mobile device stops at a position in the first delivery destination, the communication circuit receives the second mark information from the mark management server device, the path generating circuit sets the second object as a second delivery destination and generates a fifth path from the position in the first delivery destination at which the autonomous mobile device stops to the second delivery destination, based on the second mark information and the map information, and the control circuit controls the autonomous mobile device to move to the second delivery destination based on the fifth path.

12. A method using an autonomous mobile device including a mounter on which an item to be delivered is mounted, the method comprising:

receiving first mark information from a mark management server device, the first mark information being stored in a memory of the mark management server device, the first mark information being sent from a camera that images a delivery area of the autonomous mobile device to the mark management server device, the first mark information including identification information concerning a first mark and position information indicating a position of the first mark in a map space, the first mark being attached to a first object placed within the delivery area, upon receiving a piece of the first mark information from the camera, the mark management server device updating the first mark information stored in the memory of the mark management server device with the piece of the first mark information received from the camera, wherein the first mark is a machine readable printed pattern, which provides the first mark information upon reading of the first mark;

setting the first object to which the first mark is attached as a first delivery destination and generating a path from a moving start position of the autonomous mobile device to the first delivery destination, based on the first mark information and map information concerning the delivery area stored in a memory of the autonomous mobile device, wherein the path from the moving start position to the first delivery destination is first generated in response to receiving the first mark information; and controlling the autonomous mobile device to move to the first delivery destination based on the path, wherein, while moving to the first delivery destination, if the autonomous mobile device receives a piece of the first mark information from the mark management server device, generating, by the autonomous mobile device, a second path from a current position of the autonomous mobile device to the first delivery destination, based on the piece of the first mark information received from the mark management server device and the map information, controlling the autonomous mobile device to move based on the second path, wherein, when the camera images the delivery area to generate an image, generating, by the camera, as the piece of the first mark information, information including the identification information concerning the first mark and the position information indicating the position of the first mark in the map space, based on the generated image, and sending, by the camera, the piece of the first mark information to the mark management server device, wherein the method further comprises:

storing, by the autonomous mobile device, first delivery destination information including the identification information concerning the first mark and information concerning a shape and a size of the first object;

calculating, by the autonomous mobile device, a stop position at which the autonomous mobile device is to stop in the first delivery destination, based on the first delivery destination information and the first mark information;

generating, by the autonomous mobile device, a third path from the moving start position or the current position of the autonomous mobile device to the stop position as a path to the first delivery destination;

calculating, by the camera, an orientation of the first mark; and sending, by the camera, as the first mark information, information including the identification information concerning the first mark, the position information indicating the position of the first mark in the map space, and information indicating the orientation of the first mark to the mark management server device, and wherein, if the shape of the first object, which is the first delivery destination, is polygonal having a plurality of corners, calculating, by the autonomous mobile device, a position of each of the plurality of corners of the first object, which is the first delivery destination, calculating, by the autonomous mobile device, a plurality of stoppable positions that are separated by a first distance from the positions of the plurality of corners of the first object, selecting, by the autonomous mobile device, among the plurality of stoppable positions, a first stoppable position that is closest in distance to the moving start position of the autonomous mobile device, and setting, by the autonomous mobile device, the selected first stoppable position as the stop position.

13. A non-transitory recording medium storing a program which causes a computer including a mounter on which an item to be delivered is mounted to execute a process, the process comprising:

receiving first mark information from a mark management server device, the first mark information being stored in a memory of the mark management server device, the first mark information being sent from a camera that images a delivery area of the autonomous mobile device to the mark management server device, the first mark information including identification information concerning a first mark and position information indicating a position of the first mark in a map space, the first mark being attached to a first object placed within the delivery area, upon receiving a piece of the first mark information from the camera, the mark management server device updating the first mark information stored in the memory of the mark management server device with the piece of the first mark information received from the camera, wherein the first mark is a machine readable printed pattern, which provides the first mark information upon reading of the first mark;

setting the first object to which the first mark is attached as a first delivery destination and generating a path from a moving start position of the autonomous mobile device to the first delivery destination, based on the first mark information and map information concerning the delivery area stored in a memory of the autonomous mobile device, wherein the path from the moving start position to the first delivery destination is first generated in response to receiving the first mark information; and controlling the autonomous mobile device to move to the first delivery destination based on the path, wherein, while moving to the first delivery destination, if the autonomous mobile device receives a piece of the first mark information from the mark management server device, generating, by the autonomous mobile device, a second path from a current position of the autonomous mobile device to the first delivery destination, based on the piece of the first mark information received from the mark management server device and the map information, controlling the autonomous mobile device to move based on the second path, wherein, when the camera images the delivery area to generate an image, generating, by the camera, as the piece of the first mark information, information including the identification information concerning the first mark and the position information indicating the position of the first mark in the map space, based on the generated image, and sending, by the camera, the piece of the first mark information to the mark management server device, wherein the method further comprises:

storing, by the autonomous mobile device, first delivery destination information including the identification information concerning the first mark and information concerning a shape and a size of the first object;

calculating, by the autonomous mobile device, a stop position at which the autonomous mobile device is to stop in the first delivery destination, based on the first delivery destination information and the first mark information;

generating, by the autonomous mobile device, a third path from the moving start position or the current position of the autonomous mobile device to the stop position as a path to the first delivery destination;

calculating, by the camera, an orientation of the first mark; and sending, by the camera, as the first mark information, information including the identification information concerning the first mark, the position information indicating the position of the first mark in the map space, and information indicating the orientation of the first mark to the mark management server device, and wherein, if the shape of the first object, which is the first delivery destination, is polygonal having a plurality of corners, calculating, by the autonomous mobile device, a position of each of the plurality of corners of the first object, which is the first delivery destination, calculating, by the autonomous mobile device, a plurality of stoppable positions that are separated by a first distance from the positions of the plurality of corners of the first object, selecting, by the autonomous mobile device, among the plurality of stoppable positions, a first stoppable position that is closest in distance to the moving start position of the autonomous mobile device, and setting, by the autonomous mobile device, the selected first stoppable position as the stop position.

* * * * *